United States Patent
Kaneda et al.

(10) Patent No.: US 12,166,204 B2
(45) Date of Patent: Dec. 10, 2024

(54) POSITIVE ELECTRODE ACTIVE MATERIAL FOR LITHIUM ION SECONDARY BATTERY, METHOD OF MANUFACTURING POSITIVE ELECTRODE ACTIVE MATERIAL FOR LITHIUM ION SECONDARY BATTERY, AND LITHIUM ION SECONDARY BATTERY

(71) Applicant: SUMITOMO METAL MINING CO., LTD., Tokyo (JP)

(72) Inventors: Haruki Kaneda, Ehime (JP); Yuki Koshika, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 601 days.

(21) Appl. No.: 17/310,693

(22) PCT Filed: Feb. 19, 2020

(86) PCT No.: PCT/JP2020/006560
§ 371 (c)(1),
(2) Date: Aug. 18, 2021

(87) PCT Pub. No.: WO2020/171126
PCT Pub. Date: Aug. 27, 2020

(65) Prior Publication Data
US 2022/0131139 A1    Apr. 28, 2022

(30) Foreign Application Priority Data

Feb. 22, 2019    (JP) .................................. 2019-031046

(51) Int. Cl.
*H01M 4/505*    (2010.01)
*C01G 45/12*    (2006.01)
(Continued)

(52) U.S. Cl.
CPC ........ *H01M 4/505* (2013.01); *C01G 45/1228* (2013.01); *C01G 53/50* (2013.01);
(Continued)

(58) Field of Classification Search
None
See application file for complete search history.

(56) References Cited

U.S. PATENT DOCUMENTS

2011/0269018 A1    11/2011    Kono et al.
2015/0380737 A1    12/2015    Kawasato et al.
(Continued)

FOREIGN PATENT DOCUMENTS

CN    105474439    4/2016
EP    2654109    10/2013
(Continued)

OTHER PUBLICATIONS

International Search Report mailed on May 19, 2020 with respect to PCT/JP2020/006560.

*Primary Examiner* — Jonathan Crepeau
(74) *Attorney, Agent, or Firm* — IPUSA, PLLC

(57)    ABSTRACT

A positive electrode active material for a lithium ion secondary battery containing lithium composite oxide particles, the lithium composite oxide particles including lithium (Li), nickel (Ni), manganese (Mn), zirconium (Zr), and an additive element M (M) in an amount of substance ratio of Li:Ni:Mn:Zr:M=a:b:c:d:e, wherein $0.95 \leq a \leq 1.20$, $0.70 \leq b \leq 0.98$, $0.01 \leq c \leq 0.20$, $0.0003 \leq d \leq 0.01$, and $0.01 \leq e \leq 0.20$, and the additive element M is one or more elements selected from Co, W, Mo, V, Mg, Ca, Al, Ti, and Ta, wherein, a unit lattice volume V ($Å^3$) determined from lattice constants a and c that are calculated from an X-ray diffraction pattern in the lithium composite oxide is 117.5 $Å^3$ or more and 118.0 $Å^3$ or less, and a ratio $I_{(003)}/I_{(104)}$ of a peak (Continued)

strength $I_{(003)}$ of a (003) plane to a peak strength $I_{(104)}$ of a (104) plane is 1.70 or more.

11 Claims, 6 Drawing Sheets

(51) Int. Cl.
  *C01G 53/00* (2006.01)
  *H01M 4/525* (2010.01)
  *H01M 4/02* (2006.01)

(52) U.S. Cl.
  CPC ...... *H01M 4/525* (2013.01); *H01M 2004/021* (2013.01); *H01M 2004/028* (2013.01)

(56) References Cited

U.S. PATENT DOCUMENTS

2016/0164093 A1 6/2016 Inoue et al.
2021/0336260 A1* 10/2021 Toyama ................ C01G 53/42

FOREIGN PATENT DOCUMENTS

| | | |
|---|---|---|
| EP | 3579311 | 12/2019 |
| JP | 2003-168410 | 6/2003 |
| JP | 2016-026981 | 2/2016 |
| WO | 2019/171623 | 9/2019 |
| WO | 2019/172193 | 9/2019 |

* cited by examiner

POSITIVE ELECTRODE ACTIVE MATERIAL FOR LITHIUM ION SECONDARY BATTERY, METHOD OF MANUFACTURING POSITIVE ELECTRODE ACTIVE MATERIAL FOR LITHIUM ION SECONDARY BATTERY, AND LITHIUM ION SECONDARY BATTERY

TECHNICAL FIELD

The present invention relates to a positive electrode active material for a lithium ion secondary battery, a method of manufacturing a positive electrode active material for a lithium ion secondary battery, and a lithium ion secondary battery.

BACKGROUND OF THE INVENTION

In recent years, with the spread of portable electronic devices such as cellular phones and notebook PCs, there is a strong need for the development of small, lightweight, secondary batteries with high energy density and durability. In addition, the development of high-output secondary batteries for electric vehicles such as hybrid vehicles or electric tools is strongly desired. In addition to the above demands, the need for a secondary battery that hardly deteriorates with repeated use and high durability has been increasing.

Lithium ion secondary batteries have been proposed as secondary batteries that satisfy such requirements. A lithium ion secondary battery is configured by, for example, a negative electrode, a positive electrode and an electrolyte, or the like. Active materials of the negative electrode and the positive electrode are materials that can intercalate and de-intercalate lithium ions. Lithium ion secondary batteries have high energy density, output characteristics, and durability, as described above.

Such lithium ion secondary batteries are currently being extensively researched and developed. Among them, lithium ion secondary batteries that use layered or spinel-type lithium metal composite oxide as a positive electrode material are capable of obtaining high voltages of 4V class, and thus have being practically used as batteries with high energy density.

Examples of the positive electrode materials, that have been mainly proposed, include a lithium-cobalt composite oxide ($LiCoO_2$), which is relatively easy to synthesize, a lithium-nickel composite oxide ($LiNiO_2$), which uses nickel that is less expensive than cobalt, a lithium-nickel-cobalt-manganese composite oxide ($LiNi_{1/3}Co_{1/3}Mn_{1/3}O_2$), a lithium-manganese composite oxide ($LiMn_2O_4$), which uses manganese, a lithium-nickel-manganese composite oxide ($LiNi_{0.5}Mn_{0.5}O_2$), and the like.

In the case of lithium ion secondary batteries, gas was generated due to decomposition of electrolytes in the process of using the batteries. Therefore, a battery module and the like that can discharge gas generated inside the battery to outside of the system was studied.

For example, in Patent Document 1, a battery module has been proposed, in which the battery module is characterized by including a battery that contains battery elements such as electrodes, active materials, and electrolytes at inner side and is sealed with a laminated film; and a case that houses the battery, wherein the case is configured by a structure to support a front or a portion of the battery in the case, and the case has a protrusion, and the protrusion has a through hole from a tip end to the exterior of the case.

RELATED-ART DOCUMENTS

Patent Documents

Patent Document 1: Japanese Patent Application Laid-Open No. 2003-168410

SUMMARY OF THE INVENTION

Problems to be Solved by the Invention

Thus, it has been studied methods of discharging gases generated inside batteries to outside the system by providing additional components to battery modules. However, from the viewpoint of reducing the cost and increasing the stability of the battery, a positive electrode active material for a lithium ion secondary battery capable of suppressing the gas generation when used in the lithium ion secondary batteries had been demanded.

In addition, from the viewpoint of improving the performance of a lithium ion secondary battery, a positive electrode active material for a lithium ion secondary battery that can improve cycle characteristics when used in a lithium ion secondary battery has been demanded. Therefore, a positive electrode active material for a lithium ion secondary battery that can suppress gas generation and enhance cycle characteristics when used in a lithium ion secondary battery has been demanded.

Accordingly, in view of the above-described problems in the prior art, an object of the present invention is to provide a positive electrode active material for a lithium ion secondary battery capable of enhancing cycle characteristics and suppressing a gas generation when used in a lithium ion secondary battery.

Means for Solving the Problems

A positive electrode active material for a lithium ion secondary battery containing lithium composite oxide particles, the lithium composite oxide particles includes lithium (Li), nickel (Ni), manganese (Mn), zirconium (Zr), and an additive element M (M) in an amount of substance ratio of Li:Ni:Mn:Zr:M=a:b:c:d:e, wherein $0.95 \leq a \leq 1.20$, $0.70 \leq b \leq 0.98$, $0.01 \leq c \leq 0.20$, $0.0003 \leq d \leq 0.01$, and $0.01 \leq e \leq 0.20$, and the additive element M is one or more elements selected from Co, W, Mo, V, Mg, Ca, Al, Ti, and Ta, wherein, a unit lattice volume V (Å$^3$) determined from lattice constants a and c that are calculated from an X-ray diffraction pattern in the lithium composite oxide is 117.5 Å$^3$ or more and 118.0 Å$^3$ or less, and a ratio $I_{(003)}/I_{(104)}$ of a peak strength $I_{(003)}$ of a (003) plane to a peak strength $I_{(104)}$ of a (104) plane is 1.70 or more.

Effects of the Invention

According to one aspect of the present invention, a positive electrode active material for a lithium ion secondary battery capable of enhancing cycle characteristics and suppressing a gas generation when used in a lithium ion secondary battery can be provided.

DETAILED DESCRIPTION OF THE INVENTION

Figure 1:
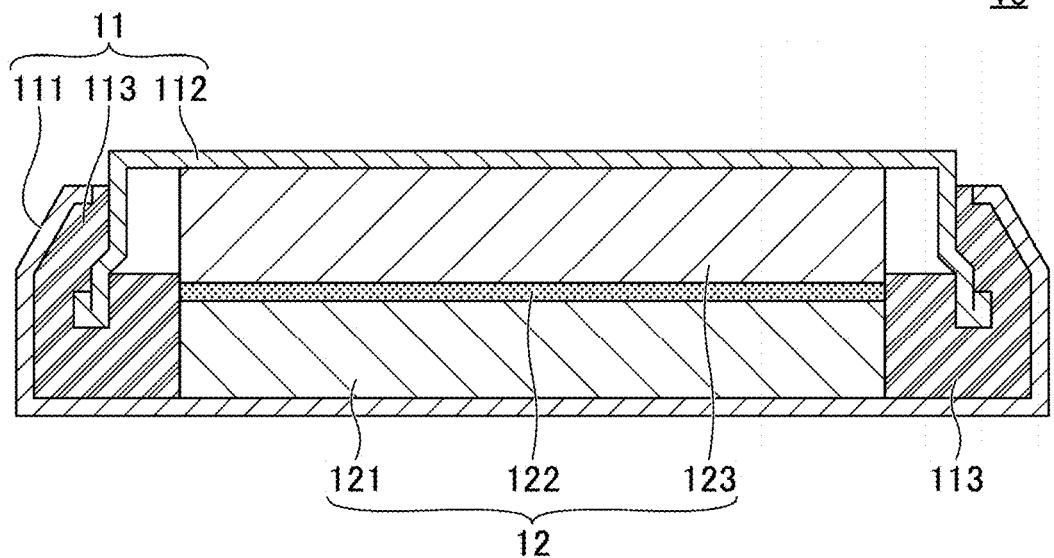
FIG. 1 is an explanatory view illustrating a cross-sectional configuration of a coin-type battery prepared in Experimental Examples.

While embodiments of the present invention will now be described with reference to the accompanying drawing, the present invention is not limited to the following embodiments, and various modifications and substitutions can be made to the following embodiments without departing from the scope of the present invention.

[Positive Electrode Active Material for Lithium Ion Secondary Battery]

The positive electrode active material for a lithium ion secondary battery according to the present embodiment (hereinafter, also referred to as "positive electrode active material") can contain lithium metal composite oxide particles.

The lithium composite oxide particles can be lithium composite oxide particles containing lithium (Li), nickel (Ni), manganese (Mn), zirconium (Zr), and an additive element M (M) in an amount of substance ratio of Li:Ni:Mn:Zr:M=a:b:c:d:e.

It should be noted that a, b, c, d, and e preferably satisfy $0.95 \leq a \leq 1.20$, $0.70 \leq b \leq 0.98$, $0.01 \leq c \leq 0.20$, $0.0003 \leq d \leq 0.01$, and $0.01 \leq e \leq 0.20$. In addition, the additive element M can be one or more elements selected from Co, W, Mo, V, Mg, Ca, Al, Ti, and Ta.

In addition, in the lithium composite oxide, a unit lattice volume V (Å$^3$) determined from lattice constants a and c that are calculated from an X-ray diffraction pattern is 117.5 Å$^3$ or more and 118.0 Å$^3$ or less, and a ratio $I_{(003)}/I_{(104)}$ of a peak strength $I_{(003)}$ of a (003) plane and a peak strength $I_{(104)}$ of a (104) plane can be 1.70 or more.

The inventors of the present invention thoroughly investigated the positive electrode active material capable of enhancing cycle characteristics and suppressing gas generation when used in a lithium ion secondary battery. As a result, the present invention has been completed by finding that when used for a lithium ion secondary battery, the cycle characteristics can be enhanced and the gas generation can be suppressed by containing lithium composite oxide particles in which zirconium (Zr) is added, and setting the unit lattice volume of the lithium composite oxide within a predetermined range, and also setting the ratio $I_{(003)}/I_{(104)}$ of the peak intensity $I_{(003)}$ of the (003) plane and the peak intensity $I_{(104)}$ of the (104) plane within a predetermined range.

The positive electrode active material of the present embodiment can contain lithium composite oxide particles containing lithium (Li), nickel (Ni), manganese (Mn), zirconium (Zr), and the additive element M (M) in an amount of substance ratio of Li:Ni:Mn:Zr:M=a:b:c:d:e as described above. The positive electrode active material of the present embodiment may be composed of the lithium composite oxide particles.

The range of a indicating the lithium content of the lithium composite oxide is preferably $0.95 \leq a \leq 1.20$ and more preferably $1.00 \leq a \leq 1.10$.

The range of b indicating the lithium content of the lithium composite oxide is preferably $0.705 \leq b \leq 0.98$ and more preferably $0.75 \leq b \leq 0.95$. When the value of b is within the above-described range, that is, the content of lithium is high, a high battery capacity can be obtained when the positive electrode active material containing the lithium composite oxide particles. In addition, a cost reduction can be achieved because the content of cobalt can be decreased.

The range of c indicating the manganese content of the lithium composite oxide is preferably $0.01 \leq c \leq 0.20$ and more preferably $0.02 \leq c \leq 0.15$. When the value of c is within the above-described range, an excellent durability, a high battery capacity, and even higher stability can be obtained, with use of the positive electrode active material containing such lithium composite oxide particles for a lithium ion secondary battery.

The range of d indicating the zirconium content of the lithium composite oxide is preferably $0.0003 \leq d \leq 0.01$ and more preferably $0.0005 \leq d \leq 0.008$. When the value of d is within the above-described range, a gas generation can be suppressed, with use of the positive electrode active material containing such lithium composite oxide particles for a lithium ion secondary battery. This is probably because the structure of lithium composite oxide is stabilized, thereby suppressing an excess lithium (eluted lithium) and suppressing a gas generation due to a reaction of the electrolyte and the excess lithium. In addition, it is considered that a stable Zr—O structure can be formed in a crystal of the lithium composite oxide. Thereby, when the positive electrode active material containing the lithium composite oxide particles is used for a lithium ion secondary battery, the cycle characteristic can be enhanced.

The range of e indicating the additive element M content of the lithium composite oxide is preferably $0.01 \leq e \leq 0.20$ and more preferably $0.03 \leq e \leq 0.18$. By containing the additive element M, when the positive electrode active material containing the lithium composite oxide particles is used for a lithium ion secondary battery, the cycle characteristics, output characteristics, and the like can be enhanced.

The description of the type of elements that can be preferably used as the additive element M will be omitted here because it has been described previously.

In the lithium composite oxide, a sum of b, c, d, and e, in which b, c, d, and e indicate a content of nickel, manganese, zirconium, and the additive element M, respectively, preferably satisfies 1. That is, the sum of the content preferably satisfies b+c+d+e=1.

As described above, the lithium composite oxide may contain lithium, nickel, manganese, zirconium, and additive element M in a predetermined ratio, and the specific composition thereof is not particularly limited, but may be represented by, for example, the general formula: $Li_aNi_bMn_cZr_dM_eO_{2+\alpha}$. It is preferable that a, b, c, d, and e in the general formula respectively satisfy the aforementioned range. In addition, it is preferable that $\alpha$ is, for example, $-0.2 \leq \alpha \leq 0.2$, among the $2+\alpha$ indicating an oxygen content.

In addition, in the lithium composite oxide contained in the positive electrode active material of the present embodiment, a unit lattice volume V (Å$^3$) determined from lattice constants a and c that are calculated from an X-ray diffraction pattern is preferably 117.5 Å$^3$ or more and 118.0 Å$^3$ or less and more preferably 117.5 Å$^3$ or more and 117.8 Å$^3$ or less. It should be noted that the unit lattice volume V can be calculated by the formula V=a$^2$×c with use of the lattice constants a and c.

In addition, in the lithium composite oxide contained in the positive electrode active material of the present embodiment, the ratio (peak strength ratio) $I_{(003)}/In_{(104)}$ of the peak strength of (003) plane and the peak strength of (104) plane determined from an X-ray diffraction pattern is preferably 1.70 or more and more preferably 1.75 or more.

When the unit lattice volume and the peak strength ratio $I_{(003)}/I_{(104)}$ are within the above-described range, it means that the lithium composite oxide has a high crystallinity, and the excess lithium (eluted lithium) can be suppressed, and the gas generation due to the reaction between the electrolyte and the excess lithium can be suppressed. In addition, by increasing the crystallinity of the lithium composite oxide, the structure stabilizes even when lithium is intercalated or de-intercalated. Thereby, when the positive electrode active material contained in the lithium composite oxide particles is applied for a lithium ion secondary battery, the cycle characteristics can be enhanced. Further, when the unit lattice volume is within the above-describe range, zirconium is suitably solid-solubilized, and this indicates a formation of stabilized Zr—O structure. Therefore, this can also be an index of whether or not an active material having excellent cycle characteristics and an effect of suppressing gas generation is obtained.

In the positive electrode active material of the present embodiment, the amount of eluted lithium, which is determined by the Warder method, is preferably 0.02% by mass or more and 0.15% by mass or less and more preferably 0.02% by mass or more and 0.12% by mass or less. The amount of eluted lithium is determined by the Warder method as described above. Specifically, for example, the amount of eluted lithium indicates that the amount of lithium calculated by neutralization titration of the filtrate after adding pure water to the positive electrode active material and stirring for a certain period of time. The amount of eluted lithium can be calculated by evaluating the state of eluted lithium compounds from the neutralization point appears by adding hydrochloric acid while measuring the pH of the filtrate described above.

The amount of eluted lithium indicates the ratio occupied in the positive electrode active material of excess lithium adhering to the surface of the lithium composite oxide particles of the positive electrode active material of the present embodiment. By adjusting the amount of eluted lithium to 0.15% by mass or less as described above, when the positive electrode active material of the present embodiment is used for a lithium ion secondary battery, the reaction between the electrolyte and the excess lithium can be suppressed. Accordingly, the generation of various gases such as carbon dioxide gas, hydrogen carbonate gas, and CO gas during the charging and discharging reaction can be particularly reduced, and a cell expansion can be suppressed.

Further, by setting the amount of excess lithium to 0.15% by mass or less, a gelation of a slurry containing the positive electrode active material during preparation of the electrode is unlikely generated, and the defect in the manufacturing process of the positive electrode can be reduced. In other words, the improvement of the yield can be obtained as an advantage in the production process.

However, in the positive electrode active material of the present embodiment, if an attempt is made to excessively reduce the amount of eluted lithium, the content ratio of lithium inside the particles may decrease, and the battery characteristics may deteriorate. Therefore, the amount of eluted lithium from the positive electrode active material of the present embodiment is preferably 0.02% by mass or more.

The positive electrode active material of the present embodiment can further contain a lithium-zirconium composite oxide. The lithium-zirconium composite oxide is an oxide containing lithium and zirconium, such as $Li_2ZrO_3$ and the like.

According to the inventors of the present invention, when the positive electrode active material of the present embodiment contains a lithium-zirconium composite oxide, the amount of excess lithium can be particularly suppressed, and when used for a lithium ion secondary battery, the reaction between the electrolyte and the excess lithium can be suppressed. Therefore, the generation of various gases such as carbon dioxide gas, hydrogen carbonate gas, CO gas, and the like during the charging and discharging reaction can be particularly reduced, and the expansion of a cell can be suppressed.

Further, by suppressing the amount of excess lithium, a gelation of a slurry containing the positive electrode active material during preparation of the electrode is unlikely generated, and the defect in the manufacturing process of the positive electrode can be reduced. In other words, the improvement of the yield can be obtained as an advantage in the production process.

It should be noted that the amount of the lithium-zirconium composite oxide of the positive electrode active material in the present embodiment may be extremely small in some cases, it may not be sufficiently detectable in some cases by an analysis using a typical powder X-ray diffraction apparatus. Therefore, for example, it is preferable to perform an analysis using a diffraction pattern measured using a light source such as a Synchrotron Radiation which is high brightness or the like.

The water content of the positive electrode active material of the present embodiment is preferably 0.10% by mass or less and more preferably 0.08% by mass or less. When the water content of the positive electrode active material in the present embodiment is 0.10% by mass or less, it is particularly possible to suppress the formation of lithium compounds on the surface of the particles by reacting gas components including carbon and sulfur in the atmosphere with excess lithium and the like. Therefore, when the positive electrode active material is used for a lithium ion secondary battery, the generation of gas can be particularly reduced, and a cell expansion can be suppressed.

In addition, by setting the water content to the above-described range, a gelation of a slurry containing the positive electrode active material during preparation of the electrode is unlikely generated, and the defect in the manufacturing process of the positive electrode can be reduced. In other words, the improvement of the yield can be obtained as an advantage in the production process.

The lower limit value of the water content of the positive electrode active material in the present embodiment is not particularly limited, and can be, for example, 0 or more.

It should be noted that a measured value of the water content of the above is the value measured by Karl-Fischer Moisture Meter at a vaporization temperature of 300° C.

The lithium composite oxide particles contained in the positive electrode active material of the present embodiment can contain the secondary particles formed by aggregation of the primary particles as described above. The lithium composite oxide particles may also be constituted from the secondary particles formed by aggregation of the primary particles. The average particle size D50 of the lithium composite oxide particles is preferably 10 μm or more and 15 μm or less and more preferably 10.5 μm or more and 14.5 μm or less. When the average particle size D50 of the lithium composite oxide particles is in the above-described range, the output characteristics and the battery capacity can be particularly increased and also the filling ability to the positive electrode can be achieved, when the positive electrode active material of the present embodiment is used for the positive electrode of a lithium ion secondary battery. Specifically, when the average particle size D50 of the lithium composite oxide particles is 10 μm or more, the filling ability to the positive electrode can be increased. In addition, when the average particle size of the lithium composite oxide particles is 15 μm or less, the output characteristics and the battery capacity can be particularly increased.

In the present specification, the average particle size refers to the particle size at the cumulative value of 50% in the particle size distribution as determined by a laser diffraction-scattering method.

In addition, a specific surface area measured by a BET method of the lithium composite oxide containing the positive electrode active material of the present embodiment is preferably 0.1 m$^2$/g or more and 0.4 m$^2$/g or less.

It is preferable to set the specific surface area of the lithium composite oxide contained in the positive electrode active material of the present embodiment within the above-described range, the output characteristic and the stability can be particularly enhanced.

Specifically, by setting the specific surface area to 0.4 m$^2$/g or less, it is capable of increasing the filling density when preparing the positive electrode, and of increasing the energy density as the positive electrode active material. Furthermore, by setting the specific surface area to 0.4 m$^2$/g or less, the amount of excess lithium present on the surface of the particles can be suppressed, and thus the reaction between the electrolyte and the excess lithium can be suppressed. Therefore, it is possible to significantly reduce the generation of various gases such as carbon dioxide gas, hydrogen carbonate gas, CO gas, and the like during the charging and discharging reaction, thereby preventing a cell from expanding. Furthermore, by suppressing the amount of excess lithium, a gelation of a slurry containing the positive electrode active material during preparation of the electrode is unlikely generated, and the defect in the manufacturing process of the positive electrode can be reduced. In other words, the improvement of the yield can be obtained as an advantage in the production process.

In addition, when the specific surface area is set to 0.1 m$^2$/g or more, the contact area with the electrolyte can be increased, and the positive electrode resistance can be suppressed. Therefore, the output characteristic can be particularly increased.

Although a circularity determined by a flow-type image analysis method using a wet-type flow particle size and shape analyzer of the positive electrode active material in the present embodiment is not particularly limited, the circularity is preferably 0.92 or more and 0.97 or less, and more preferably 0.935 or more and 0.97 or less. By setting the circularity of the positive electrode active material according to the embodiment is within the above-described range, the filling ability when manufacturing the electrode plate becomes excellent. Therefore, the electrode plate having a high energy density can be realized, and the output characteristics when using the electrode plate as a lithium ion secondary battery can be increased. Furthermore, the circularity of the positive electrode active material in the present embodiment is within the above-described range, indicating that a sintering aggregation is low, and abnormal grain growth does not occur due to oxygen defect. For this reason, the circularity is an indicator for quantitatively judging the degree of sintering aggregation and the presence or absence of abnormal grain growth associated with oxygen defect. It should be noted that when the circularity is measured for a plurality of particles, the average value (average circularity) may be set as the circularity of the above, and the average value preferably satisfies the above-described range. In addition, when evaluating the circularity of the positive electrode active material of the present embodiment, the particles, specifically for example, the lithium composite oxide particles are evaluated. Therefore, the circularity of the positive electrode active material can also be referred to as the circularity of the lithium composite oxide particles.

[Method of Manufacturing Positive Electrode Active Material for Lithium Ion Secondary Battery]

Next, an example of a method of manufacturing a positive electrode active material for a lithium ion secondary battery of the present embodiment (hereinafter, also referred to as a "method of manufacturing a positive electrode active material") will be described.

According to the method of manufacturing the positive electrode active material of the present embodiment, the positive electrode active material mentioned in the above can be manufactured. For this reason, the explanation shall be omitted for some of the matters already explained.

The method of manufacturing the positive electrode active material for a lithium ion secondary battery of the present embodiment can have the following steps.

A mixing step includes a preparation of a raw material mixture by mixing a nickel-manganese composite compound containing nickel, manganese, and an additive element M, with a lithium compound, and a zirconium compound having an average particle size of 0.5 μm or more and 5.0 μm or less.

A firing step includes a firing of the raw material mixture at a temperature of 750° C. or higher and 900° C. or lower under an oxygen-containing atmosphere in which an oxygen concentration is 80% by volume or more and 97% by volume or less.

The raw material mixture preparing in the mixing step can contain lithium (Li), nickel (Ni), manganese (Mn), zirconium (Zr), and the additive element M (M) in an amount of substance ratio of Li:Ni:Mn:Zr:M=a:b:c:d:e. It should be noted that a, b, c, d, and e preferably satisfy $0.95 \le a \le 1.20$, $0.70 \le b \le 0.98$, $0.01 \le c \le 0.20$, $0.0003 \le d \le 0.01$, $0.01 \le e \le 0.20$. In addition, the additive element M is one or more elements selected from Co, W, Mo, V, Mg, Ca, Al, Ti, and Ta.

Hereinafter, each step will be described in detail.

(A) Mixing Step

In the mixing step, a nickel-manganese composite compound, a lithium compound, and a zirconium compound can be mixed to obtain a raw material mixture.

The nickel-manganese composite compound may contain nickel, manganese, and an additive element M, but is not particularly limited. For example, one or more kinds selected from a nickel-manganese composite oxide and a nickel-manganese composite hydroxide may be preferably used. The nickel-manganese composite hydroxide may be prepared by a crystallization reaction or the like. In addition, the nickel-manganese composite oxide can be obtained by oxidizing roasting the nickel-manganese composite hydroxide.

The nickel-manganese composite compound is a source of nickel, manganese, and the additive element M. Therefore, nickel (Ni), manganese (Mn), and the additive element M (M) are preferably contained in the amount of substance ratio of Ni:Mn:M=b:c:e in accordance with a target composition of the raw material mixture. The range of b, c, and e can be the same range as that described for the lithium composite oxide in the positive electrode active material, the explanation will be omitted here.

For example, in the case where a nickel-manganese composite oxide is used as a nickel-manganese composite compound, a nickel-manganese composite oxide represented by $Ni_{b'}Mn_{c'}M_{e'}O_{1+\beta}$ can be preferably used. In addition, when a nickel-manganese composite hydroxide is used as a nickel-manganese composite compound, a nickel-manganese composite hydroxide represented by $Ni_{b'}Mn_{c'}M_{e'}(OH)_{2+\gamma}$ may be preferably used. It should be noted that the b', c', and e' in the above-described chemical formula preferably satisfy the relationship with aforementioned b, c, e such as b':c':e'=b:c:e, and also satisfy b'+c'+e'=1. In addition, β preferably satisfies $-0.2 \leq \beta \leq 0.2$, and γ preferably satisfies $-0.2 \leq \gamma \leq 0.2$.

The lithium compound is not particularly limited, but one or more kinds selected from, for example, lithium carbonate, lithium hydroxide, or the like can be used. In addition, lithium hydroxide may have hydration water. In some case, the lithium hydroxide contains hydration water, and the lithium hydroxide can be used as including the hydration water. However, the lithium hydroxide is preferably roasted in advance so that the hydration water is reduced.

As a zirconium compound, zirconium oxide (zirconia) or the like can be used. In addition, extremely small amount of a lithium-zirconium composite oxide can be formed by adding a zirconium compound without adding zirconium into the nickel-manganese composite compound in advance. Then, by containing the lithium-zirconium composite oxide, the amount of eluted lithium of the positive electrode active material obtained by the method of manufacturing the positive electrode active material of the present embodiment can be suppressed.

It is preferable that the particle sizes or the like of the nickel-manganese composite compound, lithium compound, and zirconium compound may be adjusted in advance so as to obtain the desired lithium composite oxide after the firing step.

For example, the average particle size of the zirconium compound particles is preferably 0.5 μm or more and 5.0 μm or less and more preferably 0.5 μm or more and 3.0 μm or less. According to the studies by the inventors of the present invention, by adjusting the average particle size of the zirconium compound to the above-described range, the uniformity of the zirconium distribution in the obtained positive electrode active material can be particularly enhanced.

For mixing the nickel-manganese composite compound, the lithium compound, and the zirconium compound, a general mixer may be used. For example, one or more kinds selected from a shaker mixer, a Loedige mixer, a Julia mixer, a V blender, and the like may be used. The mixing conditions in the mixing step are not particularly limited, but the mixing conditions are preferably selected so that the components used as the raw material are sufficiently mixed to the extent that the shape of particles or the like of the raw material such as the nickel-manganese composite compound are not destroyed.

It is preferable that the raw material mixture is thoroughly mixed in the mixing step before being provided to the firing step. If mixing is insufficient, problems such as variations in Li/Me between individual particles and inadequate battery characteristics may arise. It should be noted that the Li/Me refers to a ratio of the number of atoms of lithium and metals other than lithium contained in the raw material mixture.

It is preferable that the nickel-manganese composite compound, the lithium compound, and the zirconium compound are weighed and mixed so as to contain lithium (Li), nickel (Ni), manganese (Mn), zirconium (Zr), and the additive element M (M) in the amount of substance ratio of Li:Ni:Mn:Zr:M=a:b:c:d:e in the raw material mixture after mixing. The preferred ranges of a, b, c, d, and e in the formula can be the same range as those described for the lithium composite oxide in the positive electrode active material, therefore, the explanation will be omitted here.

This is because the content ratio of each metal hardly changes before and after the firing step, and the content ratio of each metal in the raw material mixture is preferably mixed so as to be the same as the desired content ratio of each metal of the positive electrode active material obtained by the method of manufacturing the positive electrode active material of the present embodiment.

(B) Firing Step

In the firing step, the raw material mixture obtained in the mixing step can be fired at a temperature of 750° C. or higher and 900° C. or lower under an oxygen-containing atmosphere in which the oxygen concentration is 80% by volume or more and 97% by volume or less, and a lithium composite oxide can then be obtained.

When the raw material mixture is fired in the firing step, lithium in the lithium compound and zirconium in the zirconium compound diffuse into the particles of the nickel-manganese composite compound, thereby forming a lithium composite oxide composed of particles having a polycrystalline structure.

In the firing step, as described above, the raw material mixture is preferably fired under an oxygen-containing atmosphere in which the oxygen concentration is 80% by volume or more and 97% by volume or less.

According to the studies by the inventors of the present invention, the oxygen concentration in the firing step affects the crystallinity of the resulting lithium composite oxide. Then, by setting the oxygen concentration in the firing step to the above-described range, the crystallinity can be sufficiently increased, and the unit lattice volume or the peak strength ratio $I_{(003)}/I_{(104)}$ calculated from an X-ray diffraction pattern of the resulting lithium composite oxide particles can be within the desired range.

The oxygen concentration of the atmosphere in the firing step is preferably 80% by volume or more and 95% by volume or less. It should be noted that the remaining components of the atmosphere other than oxygen in the firing step are not particularly limited, but inert gases such as nitrogen, noble gas, or the like are preferably used.

In addition, in the firing step, as described above, the raw material mixture is preferably fired at a temperature of 750° C. or higher and 900° C. or lower, and is more preferably fired at a temperature of 780° C. or higher and 900° C. or lower.

By setting the firing temperature to 750° C. or higher, the diffusion of lithium and zirconium into the particles of the nickel-manganese composite compound can be sufficiently achieved. Therefore, for example, excess lithium or unreacted particles can be prevented from remaining, and a lithium composite oxide with desired composition and well-defined crystal structure can be obtained. When the positive electrode active material containing the particles of lithium composite oxide is used for a lithium ion secondary battery, desired battery characteristics can be obtained.

In addition, by setting the firing temperature to 900° C. or lower, sintering between the particles on the lithium composite oxide formed can be suppressed, thereby preventing the occurrence of abnormal particle growth. It should be noted that if the abnormal particle growth occurs, the particles after firing become coarse, and a form of particles may not be maintained. Also, if a positive electrode is formed, a specific surface area may decrease and a resistance of the positive electrode raises, resulting in decreasing of a battery capacity.

The firing time is preferably 3 hours or longer and more preferably 6 hours or longer and 24 hours or shorter. When the firing time is set to 3 hours or longer, a formation of lithium composite oxide can be sufficiently progressed.

In the firing step, prior to fire at a firing temperature of 750° C. or higher and 900° C. or lower, particles of lithium compound, nickel-manganese composite compound, and zirconium compound are preferably calcinated at a temperature of 105° C. or higher and lower than 750° C., in which the temperature is lower than the firing temperature and allows the above compounds to react. The calcination temperature is preferably 400° C. or higher and 700° C. or lower. By holding the raw material mixture at such temperature and calcining the raw material mixture, lithium and zirconium are sufficiently diffused into the particles of the nickel-manganese composite compound, and a particularly uniform lithium composite oxide can be obtained. For example, when a lithium hydroxide is used as a lithium compound, the lithium hydroxide is preferably held and calcined at a temperature of 400° C. or higher and 550° C. or lower for 1 hour or longer and 10 hours or shorter.

A furnace used for firing in the firing step is not particularly limited. For example, the furnace may be one capable of firing the raw material mixture in a gas atmosphere having a predetermined oxygen concentration or in a gas flow having a predetermined oxygen concentration. However, an electric furnace which does not generate gas is preferably used, and a batch-type furnace or a continuous-type furnace may be used.

The particles of the lithium composite oxide obtained by the firing may form coarse particles due to weak sintering or aggregation, although sintering between the particles is inhibited. In such a case, it is preferable to adjust the particle size distribution by crushing the particles by canceling the aforementioned sintering and aggregation.

The particles of the lithium composite oxide obtained after the firing can be the positive electrode active material of the present embodiment.

The method of manufacturing the positive electrode active material of the present embodiment is not limited to the above-described steps, and the method may further include optional steps.

Examples of optional steps include a crystallization step of preparing the nickel-manganese composite hydroxide which is one kind of nickel-manganese composite compound to be provided in the mixing step by a crystallization method, or an oxidizing roasting step of oxidatively roasting the nickel-manganese composite hydroxide obtained in the crystallization step.

(C) Crystallization Step]

The crystallization step can include a crystallization step of crystallizing the nickel-manganese composite hydroxide particles having nickel, manganese, and an additive element M.

The detail procedures of crystallization step are not particularly limited. For example, a mixed solution containing nickel (Ni), manganese (Mn), and an additive element M may be mixed with an alkaline solution to crystallize the nickel-manganese composite hydroxide particles. In particular, for example, the following procedure is preferably performed.

First, water is put into a reactor to control the predetermined atmosphere and temperature. Note that, the atmosphere in the reactor is not particularly limited during the crystallization step, but the atmosphere, for example, can be an inert atmosphere such as a nitrogen atmosphere or the like. In addition to the inert gas, gases containing oxygen such as air can be supplied into the reactor, and the dissolved oxygen concentration of the solution in the reactor can be adjusted. Further, in addition to the water, an alkaline solution and a complexing agent that will be described later, can be added to the reactor to form an initial solution.

Next, the mixed solution containing at least nickel, manganese, the additive element M, and an alkaline solution is then added to the reactor to form a reaction solution. The reaction solution can then be stirred at a constant rate to control pH so that the nickel-manganese composite hydroxide particles can be coprecipitated and crystallized in the reactor.

In addition, a mixed solution containing some metals and a solution containing the remaining metals may be supplied instead of the mixed solution containing nickel, manganese, and the additive element M. Specifically, a mixed solution containing, for example, nickel and manganese, and a solution containing the additive element M may be supplied. In addition, a solution of each metal may be prepared separately, and a solution containing each metal may be supplied to the reactor.

The mixed solution containing nickel, manganese, and the additive element M can be prepared by dissolving salt of each metal in water which is a solvent. The type of salt is not particularly limited. For example, as the salt of nickel or manganese, one or more kinds of salts selected from sulfates, nitrates, and chlorides can be used. Although the salt of each metal may be different, the salt is preferably the same kind of salt from the viewpoint of preventing contamination by impurities.

In addition, examples of salts containing the additive element M include one or more kinds selected from cobalt sulfate, cobalt chloride, titanium sulfate, tungsten oxide, molybdenum oxide, molybdenum sulfide, vanadium pentoxide, calcium chloride, aluminum sulfate, sodium aluminate, magnesium sulfate, magnesium chloride, magnesium carbonate, and the like.

The alkaline solution can be prepared by adding an alkaline component to water which is a solvent. The type of alkaline component is not particularly limited, but for example, one or more kinds selected from sodium hydroxide, potassium hydroxide, sodium carbonate, or the like can be used.

The composition of the metal element contained in the mixed solution and that of the metal element contained in the obtained nickel-manganese composite hydroxide are almost identical. Accordingly, the composition of the metal element in the mixed solution is preferably prepared to be the same as the composition of the metal element in the desired nickel-manganese composite hydroxide.

In the crystallization step, any component other than the aqueous solution containing the above metal components (mixed aqueous solution) and alkaline solution can be added to the reaction solution.

For example, a complexing agent may be added to the reaction solution in combination with the alkaline solution.

The complexing agent is not particularly limited. Any complexing agent capable of forming a complex by binding nickel ions or other metal ions in a solution may suitably be used. Examples of complexing agents include ammonium ion suppliers. Although the ammonium ion suppliers are not particularly limited, for example, one or more kinds selected from ammonia, ammonium sulfate, ammonium chloride, ammonium carbonate, ammonium fluoride, and the like can be used.

The temperature or pH of the reaction solution in the crystallization step is not particularly limited. For example, when the complexing agent is not used, the temperature of the reaction solution is preferably higher than 60° C. and 80° C. or lower, and the pH of the reaction solution is preferably 10 or higher and 12 or lower (at 25° C.). The pH of the reaction solution in this specification refers the pH at the temperature of the reaction solution unless otherwise specified.

In the crystallization step, when the complexing agent is not used, the pH of the reaction solution is adjusted to 12 or lower, so that the nickel-manganese composite hydroxide particles are prevented from becoming fine particles, thereby being able to improve the filtration property. In addition, spherical particles can be obtained more reliably.

When the pH of the reaction solution is adjusted to 10 or higher, the rate of formation of the nickel-manganese composite hydroxide particles can be accelerated, it is capable of preventing some components such as nickel and the like from remaining in the filtrate. Therefore, the desired composition of the nickel-manganese composite hydroxide particles can be obtained more reliably.

When the complexing agent is not used in the crystallization step, the solubility of nickel is increased by adjusting the temperature of the reaction solution to over 60° C. Therefore, it is capable of avoiding the phenomenon in which the amount of precipitated nickel deviates from the target composition and coprecipitation does not occur more reliably.

In addition, when the temperature of the reaction solution is adjusted to 80° C. or lower, evaporation of water can be suppressed, thereby preventing the slurry concentration from increasing. It is capable of suppressing the precipitation of unintentional crystals, such as sodium sulfate, in the reaction solution, and capable of suppressing the concentration of impurities becoming high.

In contrast, when an ammonium ion supplier such as ammonia is used as a complexing agent, the pH of the reaction solution in the crystallization step is preferably 10 or higher and 13.5 or lower, because the solubility of Ni increases. In addition, in this case, the temperature of the reaction solution is preferably 30° C. or higher and 60° C. or lower.

When the ammonium ion supplier is added to the reaction solution as a complexing agent, the ammonia concentration in the reaction solution in the reactor is preferably maintained within a range of 3 g/L or higher and 25 g/L or lower.

When the ammonia concentration in the reaction solution is adjusted to 3 g/L or higher, the solubility of the metal ions can be particularly maintained to be constant. Therefore, primary particles of nickel-manganese composite hydroxide with well-shaped and well-sized particles can be formed. Therefore, for the obtained nickel-manganese composite hydroxide particles, the broadness of the particle size distribution can be suppressed.

In addition, by adjusting the concentration of ammonia in the reaction solution to 25 g/L or lower, excessively high solubility of the metal ions can be prevented, and the amount of metal ions remaining in the reaction solution can be suppressed. Therefore, the nickel-manganese composite hydroxide particles of the desired composition can be obtained more reliably.

When the ammonia concentration varies, the solubility of the metal ions varies, and uniform hydroxide particles may not be formed. Therefore, it is preferable to maintain the ammonia concentration within a certain range. For example, during the crystallization step, the ammonia concentration is preferably maintained at the desired concentration with the upper and lower ranges being within about 5 g/L.

The precipitate can then be collected after it has reached a steady state, filtered, and washed by water to yield nickel-manganese composite hydroxide particles. Alternatively, the mixed solution and an alkaline solution, and possibly a solution containing an ammonium ion supplier, can be continuously supplied to the reactor, the precipitate is collected by overflowing from the reactor, and the precipitate is filtered and washed by water to yield nickel-manganese composite hydroxide particles.

The additive element M may be added by coating the surface of nickel-manganese composite hydroxide particles with the additive element M in order to optimize the crystallization conditions and facilitate control of the composition ratio. In this case, the crystallization step may further include a coating step of coating the additive element M to the surface of the particles of the resulting nickel-manganese composite hydroxide.

In the coating step, the method of coating the additive element M onto the surface of the nickel-manganese composite hydroxide particles is not particularly limited. For example, any known methods can be used.

For example, the nickel-manganese composite hydroxide particles are dispersed in pure water to form a slurry. The slurry is mixed with a solution containing the additive element M with a desired coverage amount, and an acid is added dropwise to adjust the slurry to a predetermined pH. At this time, the acid used is not particularly limited, but one or more acids selected from, for example, sulfuric acid, hydrochloric acid, nitric acid, and the like can be preferably used.

After the pH value is adjusted, filtration and drying can be performed after mixing for a predetermined time to obtain the nickel-manganese composite hydroxide coated with the additive element M.

The method of coating the additive element M to the surface of the particles of the nickel-manganese composite hydroxide is not limited to the above-described method. For example, a method of drying a solution containing a compound of the additive element M and a solution containing nickel-manganese composite hydroxide particles by spray drying, a method of impregnating a solution containing a compound of the additive element M to the nickel-manganese composite hydroxide particles, and the like may be used.

It should be noted that the particles of the nickel-manganese composite hydroxide provided for the coating step may be the particles in which a portion of the additive element M is added in advance and may be the particles in which the additive element M is not contained. In the case where a portion of the additive element M is added in advance, a solution containing the additive element M may be added to the mixed solution at the time of performing the crystallization as described above. Thus, when the particles of the nickel-manganese composite hydroxide contain a portion of the additive element M, the amount of the additive element M to be added in the coating step is preferably adjusted so as to obtain a desired composition.

(D) Oxidizing Roasting Step

When an oxidizing roasting step is performed, the nickel-manganese composite hydroxide obtained in the crystallization step is roasted in an oxygen-containing atmosphere and then cooled to a room temperature to obtain the nickel-manganese composite oxide. In the oxidizing roasting step, the water content is reduced by firing the nickel-manganese composite hydroxide, and at least a portion of the nickel-manganese composite hydroxide can be converted to the nickel-manganese composite oxide as described above. However, in the oxidizing roasting step, it is not necessary to completely convert the nickel-manganese composite hydroxide to the nickel-manganese composite oxide, and the nickel-manganese composite oxide described herein may contain, for example, the nickel-manganese composite hydroxide or an intermediate thereof.

The roasting conditions in the oxidizing roasting step are not particularly limited, but the roasting is preferably performed in an oxygen-containing atmosphere, for example, in an atmosphere gas at a temperature of 350° C. or higher and 1000° C. or lower for 5 hours or longer and 24 hours or shorter.

This is because it is preferable that the specific surface area of the obtained nickel-manganese composite oxide can be prevented from being excessively large by setting the firing temperature to 350° C. or higher. Further, it is preferable that the specific surface area of the nickel-manganese composite oxide can be prevented from being excessively small by setting the firing temperature to 1000° C. or lower.

It is preferable to set the firing time to 5 hours or longer because the temperature inside of the firing container can be particularly uniform, thereby capable of uniformly progressing the reaction. In addition, even if the firing is performed longer than 24 hours, a significant change cannot be observed in the obtained nickel-manganese composite oxide. Therefore, the firing time is preferably 24 hours or shorter from the view point of energy efficiency.

The concentration of oxygen in the oxygen-containing atmosphere during the heat treatment is not particularly limited, but for example, the concentration of oxygen is preferably 20% by volume or higher. The upper limit of the oxygen concentration in the oxygen-containing atmosphere may be 100% by volume because the oxygen atmosphere may be used in the heat treatment.

[Lithium Ion Secondary Battery]

The lithium ion secondary battery according to the present embodiment (hereinafter, also referred to as "secondary battery") can have a positive electrode that includes the aforementioned positive electrode active material.

Hereinafter, a configuration example of the secondary battery of the present embodiment will be described for each component. The secondary battery in the present embodiment includes, for example, a positive electrode, a negative electrode, and a non-aqueous electrolyte, and is configured by the same components as a general lithium ion secondary battery. It should be noted that the embodiments described below are merely exemplary, and the lithium ion secondary battery of the present embodiment can be implemented in various modified and improved forms based on the knowledge of a person skilled in the art, including the following embodiments. In addition, the use of the secondary battery is not particularly limited.

(Positive Electrode)

The positive electrode of the secondary battery in the present embodiment can include the positive electrode active material described above.

An example of a manufacturing method of the positive electrode will be described below. First, the aforementioned positive electrode active material (in powder form), a conductive material, and a binding agent (binder) can be mixed to form a positive electrode mixture. Further as needed, an activated carbon, a desired solvent to adjust a viscosity can be added to the positive electrode mixture, and followed by kneading to prepare a positive electrode mixture paste.

The mixing ratio of each material in the positive electrode mixture is a determinant of the performance of the lithium secondary battery. Therefore, the mixing ratio can be adjusted depending on the application. The mixing ratio of the materials may be the same as that of positive electrodes of known lithium ion secondary batteries. For example, when the total mass of solid of the positive electrode mixture without solvent is 100% by mass, the positive electrode active material may contain 60% by mass or more and 95% by mass or less, the conductive material may contain 1% by mass or more and 20% by mass or less, and the binder may contain 1% by mass or more and 20% by mass or less.

The resulting positive electrode mixture paste is coated, for example, to a surface of an aluminum foil current collector, dried to evaporate the solvent, and a sheet-like positive electrode is prepared. If necessary, a pressure may be applied by a roll-press or the like to increase the electrode density. The sheet-like positive electrode obtained in this way can be cut to a suitable size depending on a desired battery to be used, and then provided to a manufacturing of battery.

As the conductive materials, for example, graphite (natural graphite, artificial graphite, expanded graphite, and the like) or carbon black-based materials such as acetylene black, Ketchen Black (Registered Trademark), or the like can be used.

The binder serves to anchor the active material particles. For example, one or more of binders selected from polyvinylidene fluoride (PVDF), polytetrafluoroethylene (PTFE), fluorine rubber, ethylene propylene diene rubber, styrene butadiene, cellulose-based resins, polyacrylic acid, or the like can be used.

According to the need, a solvent capable of dispersing the positive electrode active material, the conductive material, and the like, and of capable of dissolving the binding agent can be added to the positive electrode mixture. As the solvent, in particular, organic solvents such as N-methyl-2-pyrrolidone and the like can be used. In addition, an activated carbon can also be added to the positive electrode mixture to increase the electric double-layer capacitance.

The method of manufacturing positive electrode is not limited to the example described above, but the positive electrode may be manufactured by other methods. For example, the positive electrode mixture may be press-molded and then dried under vacuum.

(Negative Electrode)

A lithium metal, a lithium alloy, or the like can be used for the negative electrode. As the negative electrode, a negative electrode mixture prepared by mixing a binder with a negative electrode active material capable of intercalating and de-intercalating lithium ions and adding an appropriate solvent to form a paste may be applied to the surface of a metal foil current collector such as copper, dried and, if necessary, compressed to increase the electrode density.

As for the negative electrode active material, for example, organic compounds fired body such as natural graphite, artificial graphite, phenolic resins, and the like; and powders of carbon materials such as coke and the like can be used. In this case, a fluorine-containing resin such as PVDF may be used as a negative electrode binder in the same manner as the positive electrode. An organic solvent such as N-methyl-2-pyrrolidone may be used as the solvent for dispersing the active material and the binding agent.

(Separator)

A separator can be sandwiched between the positive and negative electrodes as needed. The separator separates the positive electrode from the negative electrode and retains the electrolyte. A conventional separator can be used, for example, the separator may be a thin-film, such as polyethylene or polypropylene having a plurality of microscopic pores.

(Non-Aqueous Electrolyte)

An example of non-aqueous electrolyte includes, for example, a non-aqueous electrolytic solution.

As the non-aqueous electrolyte solution, for example, a solution in which a lithium salt as a supporting salt is dissolved in an organic solvent, may be used. As the non-aqueous electrolyte solution, the solution in which a lithium salt is dissolved in an ionic liquid, may be used. The ionic liquid is a salt that includes cations and anions other than lithium ions and is the liquid even at room temperature.

As the organic solvent, one kind of organic solvent selected from cyclic carbonates such as ethylene carbonate, propylene carbonate, butylene carbonate, trifluoropropylene carbonate, and the like; a chain-like carbonate such as diethyl carbonate, dimethyl carbonate, ethyl methyl carbonate, dipropyl carbonate, and the like; an ether compound such as tetrahydrofuran, 2-methyl tetrahydrofuran, dimethoxyethane, and the like; a sulfur compound such as ethyl methyl sulfone, butanesultone, and the like; a phosphorus compound such as triethyl phosphate, trioctyl phosphate, and the like; may be used alone. Also, two or more kinds of organic solvents may be used in combination.

As the supporting salt, $LiPF_6$, $LiBF_4$, $LiClO_4$, $LiAsF_6$, $LiN(CF_3SO_2)_2$, and their composite salts may be used. In addition, the non-aqueous electrolyte solution may contain radical scavengers, surfactants, flame retardants, and the like.

As the non-aqueous electrolyte, a solid electrolyte may be used. Solid electrolytes have the property to withstand high voltages. Examples of the solid electrolyte include inorganic solid electrolyte and organic solid electrolyte.

Examples of the inorganic solid electrolytes include an oxide-based solid electrolyte, a sulfide-based solid electrolyte, and the like.

The oxide-based solid electrolyte is not particularly limited. For example, the oxide-based solid electrolyte may preferably contain oxygen (O) and may preferably exhibit a lithium ion conductivity and an electron insulating property. The oxide-based solid electrolyte is one or more kinds selected from lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ ($0 \le X \le 1$), $Li_{1+X}Al_XGe_{2-X}(PO_4)_3$ ($0 \le X \le 1$), $LiTi_2(PO_4)_3$, $Li_{3X}La_{2/3-X}TiO_3$ ($0 \le X \le 2/3$), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like.

The sulfide-based solid electrolyte is not particularly limited. For example, the sulfide-based solid electrolyte may preferably contain sulfur (S) and may preferably exhibit a lithium ion conductivity and an electron insulating property. For example, the sulfide-based solid electrolyte is one or more kinds selected from $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$, and the like.

An inorganic solid electrolyte other than the above may be used. For example, $Li_3N$, $LiI$, $Li_3N$—$LiI$—$LiOH$, or the like may be used.

The organic solid electrolyte is not particularly limited as long as the organic solid electrolyte is a polymer compound exhibiting ionic conductivity. For example, polyethylene oxide, polypropylene oxide, copolymers thereof, and the like can be used. In addition, the organic solid electrolyte may also contain a supporting salt (lithium salt).

(Shape and Configuration of the Secondary Battery)

The lithium ion secondary battery of the present embodiment described above can be in a variety of shapes, such as cylindrical or laminated shape. In any form, when the secondary battery according to the present embodiment uses a non-aqueous electrolyte solution as a non-aqueous electrolyte, the positive electrode and the negative electrode can be laminated via a separator to form an electrode body. The obtained electrode body is impregnated with the non-aqueous electrolyte solution. Then, between the positive electrode collector and the positive electrode terminal leading to the outside and between the negative electrode collector and the negative electrode terminal leading to the outside is connected with a collector lead or the like, and sealed in a battery case.

As described above, the secondary battery according to the present embodiment is not limited to an embodiment using a non-aqueous electrolyte solution as a non-aqueous electrolyte. The secondary battery of the present embodiment may be, for example, a secondary battery using a solid non-aqueous electrolyte, that is, an all-solid-state battery. In the case of all-solid-state battery, the configuration other than the positive electrode active material can be changed as necessary.

The secondary battery of the present embodiment can suppress a generation of gas, and exhibits excellent storage stability. For this reason, the secondary battery of the present embodiment is particularly suitable for use in batteries that are susceptible to gas generation, such as laminated batteries. In addition, the secondary battery of the present embodiment can be suitably used for batteries other than the laminated type batteries because the secondary battery of the present embodiment can stabilize the battery characteristics by suppressing the generation of gas.

In addition, the secondary battery of the present embodiment can be used for various applications. The secondary battery of the present embodiment is suitable for a power source of compact portable electronic devices that require high capacity at all times (such as notebook personal computers, mobile phone terminals, and the like) because the secondary battery has a high capacity and high output. The secondary battery is suitably applied for a power source for electric vehicles that require high output.

In addition, the secondary battery of the present embodiment can be miniaturized and be capable being higher output. Therefore, the secondary battery of the present embodiment is suitably applied for a power source for electric vehicles that is constrained by the mounting space. The secondary battery according to the present embodiment can be used not only as a power source for electric vehicles driven by purely electrical energy, but also as a power source for so-called hybrid vehicles combined with a combustion engine such as a gasoline engine or a diesel engine.

EXAMPLES

Although the present invention will be described in further detail in the following examples and comparative examples, the present invention is not limited in any way by these examples.

In the following Experimental Examples, unless otherwise specified, samples of the special grade reagent manufactured by Wako Pure Chemical Industries, Ltd. were used to prepare the nickel-manganese composite compound and the positive electrode active material.

Herein, a method of evaluating the positive electrode active material and the secondary battery obtained from the following Experimental Examples will be first described.

(Evaluation of Positive Electrode Active Material)

The following evaluation was performed on the obtained positive electrode active material.

(a) Composition

The composition of the positive electrode active material was evaluated by performing an analysis with an ICP emission spectrometer (manufactured by VARIAN, 725ES). In the following Experimental Examples, the positive electrode active material may contain a lithium-zirconium composite oxide as heterogeneous phase. However, the amount of the lithium-zirconium composite oxide is extremely small. Therefore, it can be regarded that the positive electrode active material is almost composed of a lithium composite oxide. Therefore, the obtained composition of the positive electrode active material can be regarded as the composition of the lithium composite oxide. For the following average particle size and specific surface area, the evaluation results of the positive electrode active material can be regarded as the evaluation results of lithium composite oxide particles for the same reason.

(b) Confirmation of Unit Lattice Volume, Peak Strength Ratio, and Heterogenous Phase The lattice constants a and c of the lithium composite oxide were calculated from Rietveld refinement with the obtained XRD pattern using monochromatic $CuK_{\alpha 1}$ as an X-ray source by an X-ray diffraction device (Manufactured by BRUKER, D8 DISCOVER). The unit lattice volume V ($Å^3$) of the lithium composite oxide was determined from these lattice constants using the formula $V=a_2 \times c$.

In addition, the peak strength ratio $I_{(003)}/I_{(104)}$ of the peak strength $I_{(003)}$ of (003) plane present near the $2\theta=18°$ of the obtained XRD pattern to the peak strength $I_{(104)}$ of (104) plane present near the $2\theta=44°$ of the obtained XRD pattern was determined.

In addition, a phase identification was performed on the obtained XRD pattern, and it was confirmed that the presence or absence of heterogeneous phase, such as lithium-zirconium composite oxide, other than the lithium composite oxide. If a heterogeneous phase was identified, a phase identification was performed to confirm the composition of the heterogeneous phase.

(c) Average Particle Size

An average particle size D50 of the lithium composite oxide particles was measured using a laser light diffraction scattering particle size analyzer (manufactured by Nikkiso Co., Ltd., model: Microtrack HRA).

(d) Amount of Eluted Lithium

An amount of eluted lithium was evaluated by Warder method which is one of the neutralization titration methods. From the evaluation results, the amount of lithium hydroxide (LiOH) and the amount of lithium carbonate ($Li_2CO_3$) were calculated, and the sum of these amount of lithium was defined as an amount of eluted lithium.

Specifically, a pure water was added to the obtained positive electrode active material, followed by stirring. The state of compound of lithium eluting from the neutralization point was evaluated by adding a hydrochloric acid while measuring the pH of the filtered filtrate.

The titration described above was measured to the second neutralization point. The amount of lithium in the filtrate was calculated from the amount of hydrochloric acid dropped up to the second neutralization point and the concentration of hydrochloric acid, as that the alkali content which was neutralized with hydrochloric acid up to the second neutralization point was regarded as the amount of lithium (Li) derived from lithium hydroxide (LiOH) and lithium carbonate ($Li_2CO_3$).

The volume of lithium in the calculated filtrate was divided by the volume of a sample of the positive electrode active material used in preparing the filtrate, and the amount of eluted lithium was calculated by converting the unit to percent by mass.

(e) Water Content

The water content in the obtained positive electrode active material was measured by a Karl-Fischer Moisture Meter (model: CA-200 manufactured by Mitsubishi Chemical Analytech, Co., Ltd.) at a vaporization temperature of 300° C.

(f) Specific Surface Area

The specific surface area of the lithium composite oxide particles was measured by a specific surface area measuring device by a flow-type gas adsorption method (Manufactured by Yuasa Ionics Corporation, Multi-Sorb).

(g) Circularity

The circularity of the obtained positive electrode active material was evaluated using a wet-flow particle size and shape analyzer (Manufactured by Sysmex, model: FPIA-3000). After adjusting the focus with the standard sample, the measurement was performed using a dispersion liquid that was dispersed by ultra-sonication in water that was the dispersion medium of the sample powder. The liquid temperature of the dispersion liquid was set at 25° C. The concentration of the dispersion liquid was adjusted so that the measurement can be performed with the wet-flow particle size and shape analyzer.

The number of particles to be counted was set at 10,000 when measured. The captured images were analyzed and the circumference of the circle equal to the projected area was divided by the circumference of the projected image to calculate the circularity. Specifically, the circularity was calculated by the following equation (1).

$$C = 2 \times (S \times \pi)^{1/2}/L \qquad (1)$$

C: circularity, S: area of circle obtained from projected area, L: particle circumference length Analysis was performed under conditions of 0.250 µm≤circle equivalent diameter<100 µm, and 0.200≤circularity<1.00. In other words, among the 10,000 particles for which measurements were made, those particles whose circle equivalent diameter and circularity fall within the range of the above analysis conditions were selected, and the circularity was analyzed. However, all the measured particles fulfilled the above analysis conditions.

The average value of the circularity of the particles satisfying the above-described analysis conditions was then defined as the circularity of the positive electrode active material.

(Evaluation of Battery Characteristics)

The coin-type battery, indicated in FIG. 1, produced in the following Experimental Examples was used to evaluate the charge capacity, the discharge capacity, the efficiency, and the positive electrode resistance. The laminated-type battery indicated in FIG. 2 was used to evaluate the cycle characteristics, the positive resistance after the cycle, and the amount of stored gas.

(a) Charge Capacity, Discharge Capacity, and Efficiency

After the coin-type battery was manufactured in each Experimental Example, the battery was left for about 12 hours. After an open-circuit voltage (OCV) was stabilized, the capacity when the battery was charged to a cut-off voltage of 4.3 V with a current density of 0.1 mA/cm$^2$ with respect to the positive electrode was determined as the charge capacity. In addition, after charging and a pause of one hour, the capacity when discharged to a cut-off voltage of 3.0 V was determined as the discharge capacity.

Efficiency of the battery, which is the ratio of discharge capacity to charge capacity, was calculated.

(b) Positive Electrode Resistance

Figure 3A:
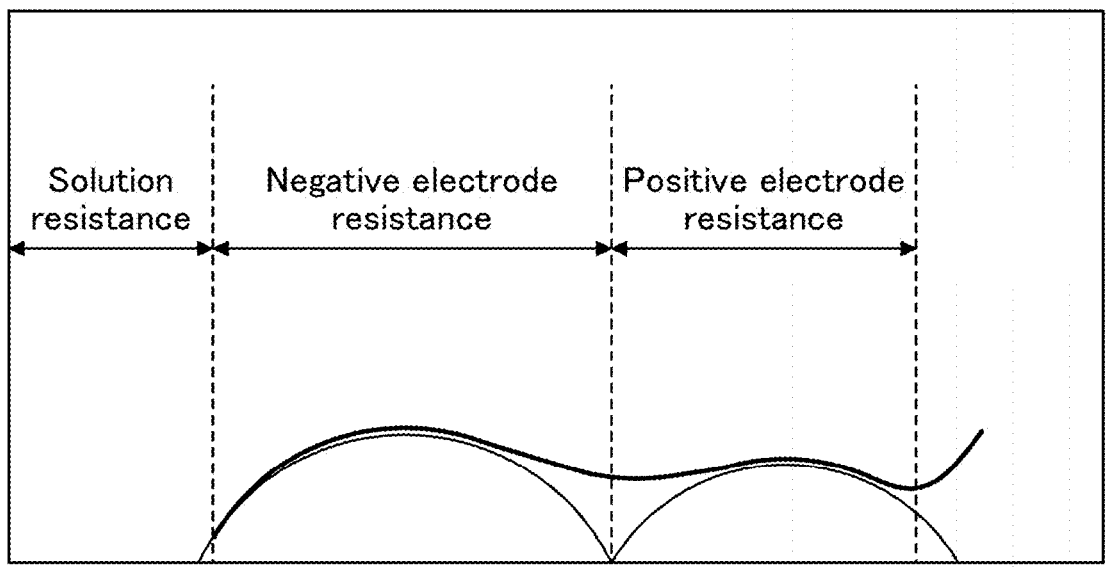
FIG. 3A is a measurement example of impedance evaluation.
Figure 3B:
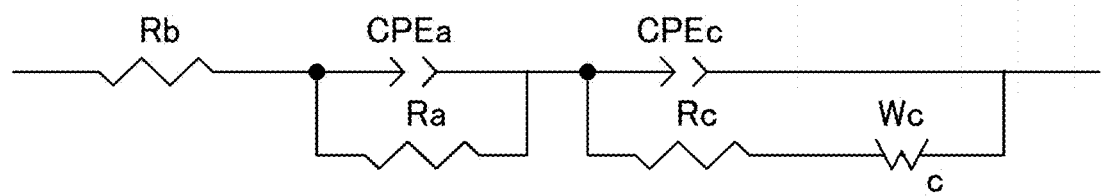
FIG. 3B is a schematic diagram of the equivalent circuit used in the analysis.

After measuring the charge and discharge capacity of (a), Constant Current-Constant Voltage (CCCV) was carried out up to 4.1 V (SOC 80%) at a rate of 0.2 C, and the resistance value of the coin-type battery after charging was measured by an AC impedance method. For the measurements, a frequency response analyzer and a potentiogalvanostat (manufactured by Solartron) were used to obtain a Nyquist plot as illustrated in FIG. 3A. A fitting calculation was performed using the equivalent circuit illustrated in FIG. 3B to calculate the value of the positive electrode resistance because the plot is expressed as the sum of the characteristic curves that indicate the solution resistance, the negative electrode resistance and its capacitance, and the positive electrode resistance and its capacitance.

(c) Cycle Characteristics

The cycle characteristics were evaluated by measuring the capacity maintenance rate after 500 cycles of charge and discharge. Specifically, the laminate-type battery was charged to a cut-off voltage of 4.2 V at a current density of 0.3 mA/cm$^2$ in a thermostatic chamber held at 25° C. After a pause of 10 minutes, the battery was discharged to a cut-off voltage of 2.5 V. Such charge-discharge conditioning was repeated for 5 cycles. The laminate-type battery was then charged to a cut-off voltage of 4.2 V at a current density of 2.0 mA/cm$^2$ in a thermostatic chamber held at 45° C. After a pause of 10 minutes, the battery was discharged to a cut-off voltage of 2.5 V. Such charge-discharge conditioning was repeated for 500 cycles. The capacity maintenance rate, which is the ratio of the discharged capacity at the 500$^{th}$ cycle after the conditioning with respect to the discharged capacity at the first cycle, was calculated and evaluated.

(d) Positive Electrode Resistance after Cycles

After 500 cycles of charge and discharge in the cycle characteristics evaluation of (c), Constant Current-Constant Voltage (CCCV) was performed, and the charging capacity was measured. Then, based on the measured charging capacity, charging was performed up to SOC 20% and SOC 80% at a rate of 0.2 C, and a resistance value was measured by an AC impedance method in the same manner as in the positive electrode resistance (b). It should be noted that a fitting calculation was performed using an equivalent circuit from the Nyquist plot obtained after the measurement to calculate the value of the positive electrode resistance after the cycle. The evaluation results are indicated in the columns of SOC 20% after cycle and SOC 80% after cycle in Table 2.

(e) Amount of Stored Gas

After the laminate-type battery was prepared, the laminate-type battery was charged to a cut-off voltage of 4.2 V at a current density of 0.3 mA/cm$^2$ in a thermostatic chamber held at 25° C. After a pause of 10 minutes, the battery was discharged to a cut-off voltage of 2.5 V. Such charge-discharge conditioning was repeated for 5 cycles. The gas generated at this time was released from the laminated-type battery. The volume of the laminated-type battery at this time was then measured by Archimedes method (Evaluation criteria of amount of stored gas).

The charge-discharge capacity was then measured, and the capacity was determined as a valuation basis. The battery was charged at Constant Current-Constant Voltage (CCCV) until 4.2 V at 25° C. so that a State of Charge (SOC) becomes 100%.

After charging, the battery was stored in a thermostatic chamber set at 60° C. for 7 days. After 7 days, the battery was discharged to 2.5 V. After discharging, the volume of the laminate-type battery was measured by Archimedes method. The amount of gas generated in the cell was evaluated from the difference of the volumes of the laminated-type battery measured after conditioning (a valuation basis of the amount of stored gas).

The amount of stored gas in Experimental Example 6 was set to 1.00, and the amounts of stored gas were indicated as relative proportions in the results.

Hereinafter, the manufacturing conditions and evaluation results of the positive electrode active materials in each Experimental Example will be described. Experimental Examples 1 to 5, and 11 are Examples, and Experimental Examples 6 to 10, and 12 are Comparative Examples.

Experimental Example 1

(1) Manufacture of Nickel-Manganese Composite Compound (Crystallization Step)

First, water was added to half of the reactor (60 L), and the temperature in the reactor was set at 49° C. while stirring. At this time, nitrogen gas (N$_2$) and air were supplied to the reactor to adjust the flow rate of N$_2$/Air so that the dissolved oxygen concentration in the liquid in the reactor was to be 1.5 mg/L or higher and 2.5 mg/L or lower.

An initial solution was prepared by adding an appropriate amount of 25% by mass of sodium hydroxide solution, which is an alkaline solution, and 25% by mass of aqueous ammonia, which is a complexing agent, to the water in the reactor so that the pH value was set to 12.4 at the liquid temperature of 49° C. and also set to the ammonia concentration of 12 g/L.

At the same time, nickel sulfate, manganese sulfate, and cobalt sulfate were dissolved in pure water so that the amount of substance ratio of nickel, manganese, and cobalt was Ni:Mn:Co=85.0:10.0:5.0 to prepare a mixed solution with a concentration of metal components of 2.0 mol/L.

This mixed solution was dropped at a constant rate with respect to the initial solution of the reactor, and was used as the reaction solution. At this time, 25% by mass of sodium hydroxide solution, which is an alkali solution, and 25% by mass of aqueous ammonia, which is a complexing agent, were also dropped onto the initial solution at a constant rate. The pH value of the reaction solution was controlled so as to maintain the pH value of 12.4 or higher and 12.5 or lower at the liquid temperature of 49° C. and the ammonia concentration of 12 g/L. The nickel-manganese composite hydroxide particles were crystallized by such an operation (crystallization step).

Thereafter, a slurry containing the nickel-manganese composite hydroxide particles collected from an overflow port which was provided in the reactor was filtered, water-soluble impurities were washed off with ion-exchange water, and then dried.

(Oxidizing Roasting Step)

The resulting nickel-manganese composite hydroxide particles were oxidative-roasted at 500° C. for 5 hours in the air (oxygen concentration: 21% by volume) flow. Accordingly, the nickel-manganese composite oxide particles containing nickel, manganese, and cobalt in the amount of substance ratio of Ni:Mn:Co=85.0:10.0:5.0 was obtained.

(2) Manufacture of Positive Electrode Active Material (Mixing Step)

The resulting nickel-manganese composite oxide particles, lithium hydroxide which is a lithium compound with an average particle size of 25 µm, and zirconium oxide with an average particle size of 1.5 µm were thoroughly mixed using a shaker mixer (TURBULA Type T2C, manufactured by Willy A. Bachofen AG (WAB)) to prepare a raw material mixture. At this time, Li/Me, which is the ratio of the number of lithium (Li) atom contained in the obtained raw material mixture to the number of atoms of the metal (Me) other than lithium, was determined to be 1.015, and each raw material was weighed and mixed so that the ratio of the number of zirconium atom among the total number of atoms of the metal component in the nickel-manganese composite oxide particles and the zirconium in zirconium oxide was 0.10 at. %.

(Firing Step)

The raw material mixture obtained in the mixing step was fired at 800° C. for 8 hours under an oxygen-containing atmosphere in which the oxygen concentration was 87% by volume and the remaining portion was nitrogen.

The resulting fired product was pulverized using a pin mill at a strength sufficient to maintain the shape of the secondary particles.

By the above-described procedure, a positive electrode active material consisting of lithium composite oxide particles (lithium composite oxide powder) was obtained.

The obtained positive electrode active material was checked for the composition and heterogenous phase. It was confirmed that the obtained positive electrode active material in the present Experimental Example was composed of lithium composite oxide represented by the general formula: $Li_{1.015}Ni_{0.849}Mn_{0.10}Zr_{0.0010}Co_{0.05}O_2$, and was confirmed to be free of heterogonous phase from the XRD pattern of the present positive electrode active material.

Figure 4A:
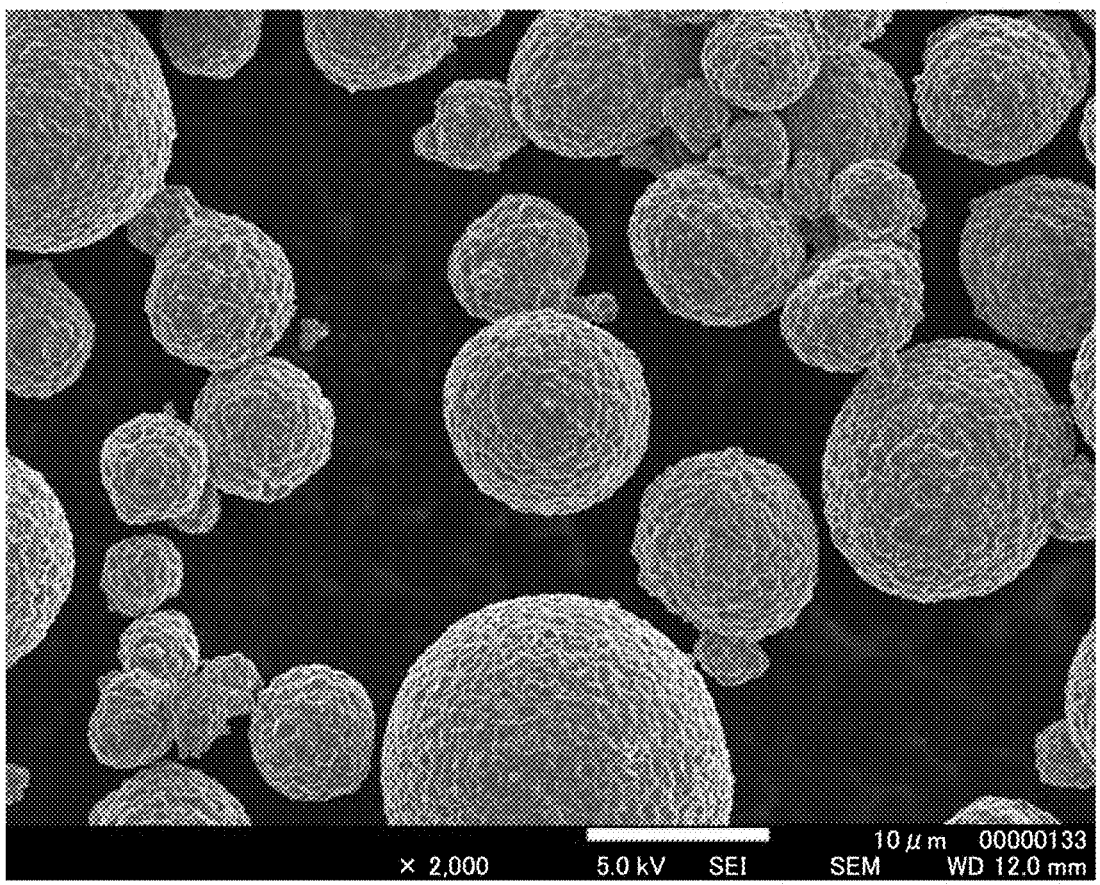
FIG. 4A is an SEM image of lithium composite oxide particles contained in a positive electrode active material of Experimental Example 1.
Figure 4B:
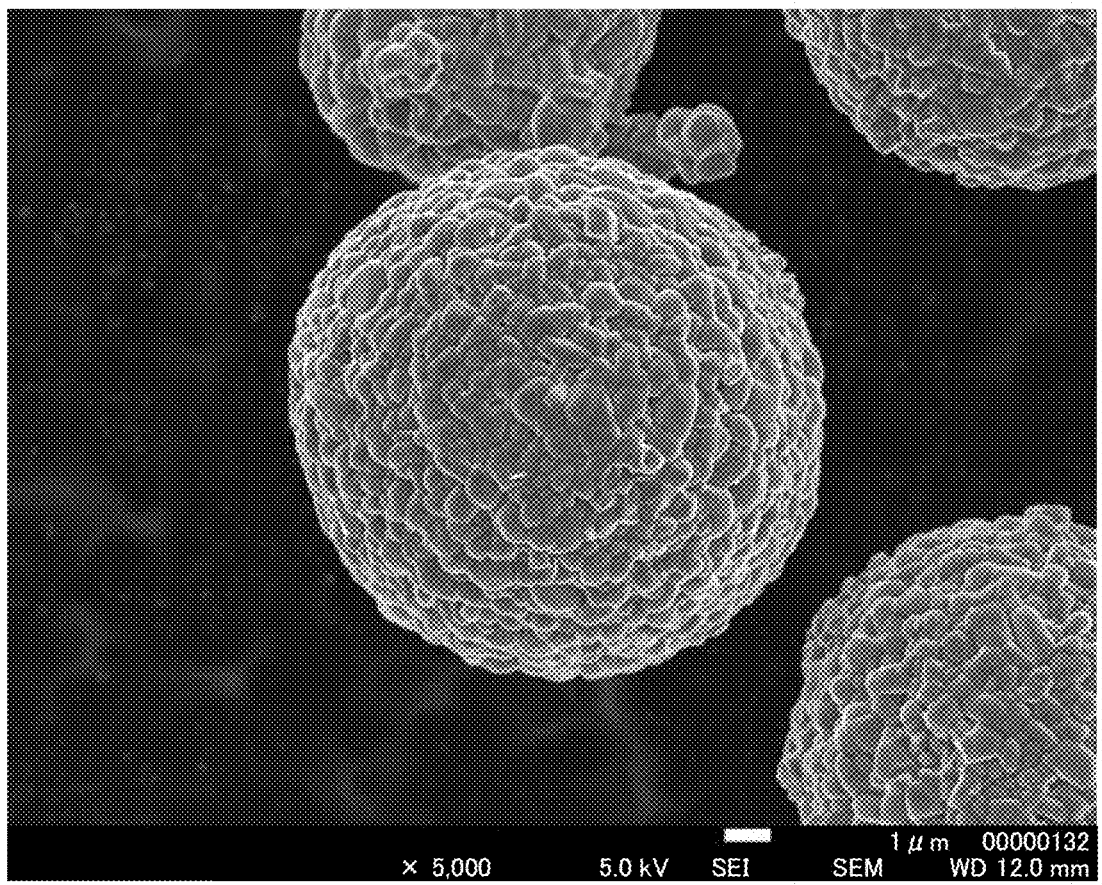
FIG. 4B is an SEM image of lithium composite oxide particles contained in a positive electrode active material of Experimental Example 1.

In addition, SEM images of the lithium composite oxide particles contained in the obtained positive electrode active material were indicated in FIGS. 4A and 4B. As indicated in FIGS. 4A and 4B, it was confirmed that the lithium composite oxide particles were composed of the secondary particles in which primary particles were aggregated.

Other evaluation results are indicated in Table 1.

(3) Manufacture of Secondary Battery

Figure 2:
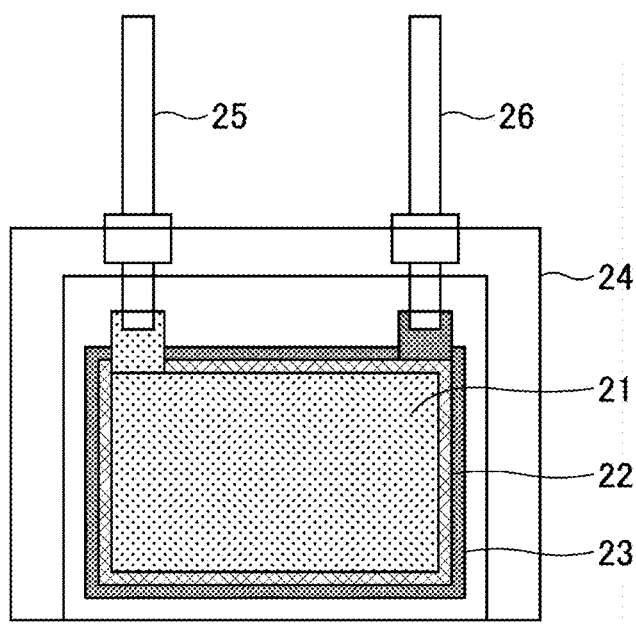
FIG. 2 is an explanatory view illustrating a configuration of a laminated-type battery prepared in Experimental Examples.

A coin-type battery having the structure as illustrated in FIG. 1 or a laminate-type battery having the structure as illustrated in FIG. 2 was manufactured by the following procedure, and the battery was evaluated as previously described.

(Coin-Type Battery)

As illustrated in FIG. 1, the coin-type battery 10 is configured by a case 11 and an electrode 12 contained within the case 11.

The case 11 has a positive electrode can 111 that is hollowed out and has one end open and a negative electrode can 112 that is disposed at the opening of the positive electrode can 111. When the negative electrode can 112 is disposed at the opening of the positive electrode can 111, a space to accommodate the electrode 12 is formed between the negative electrode can 112 and the positive electrode can 111.

The electrode 12 includes of a positive electrode 121, a separator 122, and a negative electrode 123 and is laminated in this order. The electrode 12 is housed in the case 11 so that the positive electrode 121 contacts the inner surface of the positive electrode can 111, and the negative electrode 123 contacts the inner surface of the negative electrode can 112.

The case 11 includes a gasket 113, which restricts and fixes relative movement of the positive electrode can 111 and the negative electrode can 112 so as to maintain the non-contact between the positive electrode can 111 and the negative electrode can 112. In addition, the gasket 113 also has a function of sealing the gap between the positive electrode can 111 and the negative electrode can 112 to air-tight and liquid-tight the space between the inside of the case 11 and the outside of the case.

The coin-type battery 10 was prepared as follows. First, 52.5 mg of the positive electrode active material, 15 mg of acetylene black, and 7.5 mg of polytetrafluoroethylene (PTFE) resin were mixed, and the resulting positive electrode mixture was made film-thin with a diameter of 11 mm and a weight of 75 mg until the mixture was being pellets to prepare the positive electrode 121. The prepared positive electrode 121 was dried in a vacuum dryer at 100° C. for 12 hours.

The coin-type battery 10 was prepared in a glove box under an Ar atmosphere controlled at dew point of −60° C., with use of the positive electrode 121, the negative electrode 123, the separator 122, and the electrolyte solution.

For the negative electrode 123, a lithium metal, which was punched out in the shape of a disk with a diameter of 13 mm, was used.

A polyethylene porous membrane with a thickness of 25 µm was used for the separator 122. The electrolyte solution used was a mixture of equal volumes of ethylene carbonate (EC) and diethyl carbonate (DEC) containing 1 M of $LiClO_4$ as the supporting electrolyte (manufactured by Tomiyama pure chemical industries, Ltd.).

The evaluation results are indicated in Table 2.

(Laminated-Type Battery)

As illustrated in FIG. 2, the laminate-type battery 20 has a structure in which an electrolyte solution impregnated in a laminate of a positive electrode film 21, a separator 22, and a negative electrode film 23 is sealed by a laminate 24. A positive electrode tab 25 is connected to the positive electrode film 21, and a negative electrode tab 26 is connected to the negative electrode film 23. The positive electrode tab 25 and the negative electrode tab 26 are exposed outside the laminate 24.

A 20.0 g of the obtained positive electrode active material, 2.35 g of acetylene black, and 1.18 g of polyvinylidene fluoride were dispersed in N-methyl-2-pyrrolidone (NMP) to prepare a slurry. An aluminum current collector foil was coated with the slurry so that 7.0 mg of the positive electrode active material presents per 1 cm$^2$ of the Al foil. Then, the slurry containing the positive electrode active material coated on the Al foil was dried for 30 minutes at a temperature of 120° C. in the air, and the NMP was removed. The Al foil coated by the positive electrode active material was cut into strips with 66 mm in width, and roll-pressed at 1.2 t to obtain a positive electrode film. The positive electrode film was cut out a rectangular shape of 50 mm×30 mm, and dried at 120° C. for 12 hours in a vacuum dryer to form the positive electrode film 21 of the laminate-type battery 20.

In addition, the negative electrode film 23 was prepared by coating a copper foil with a negative electrode mixture paste, which is a mixture of graphite powder having an average particle diameter of about 20 µm and polyvinylidene fluoride. A polyethylene porous membrane having a film thickness of 20 µm was used as the separator 22, and a 3:7 mixture of ethylene carbonate (EC) and diethyl carbonate (DEC) (manufactured by Ube Industries, Ltd.) with a 1 M LiPF$_6$ as the supporting electrolyte as the electrolyte were used as the electrolyte solution.

The electrolyte solution was impregnated into the laminate of the above-described positive electrode film 21, separator 22, and negative electrode film 23 in a dry room controlled at dew point of −60° C., and sealed with the laminate 24 to prepare the laminate-type battery 20.

In addition, two laminate-type batteries were manufactured for an evaluation of cycle characteristics and for an evaluation of an amount of storage gas.

Experimental Example 2

When manufacturing the positive electrode active material, in the mixing step, the same raw materials as in Experimental Example 1 were weighed and mixed so that Li/Me, which is the ratio of the number of atoms of lithium (Li) contained in the obtained raw material mixture to the number of atoms of metal (Me) other than lithium, was 1.015, the ratio of the number of atoms of zirconium among the total number of atoms of the metal component in the nickel-manganese composite oxide particles and the zirconium in zirconium oxide was 0.35 at. %.

Except the above points, the positive electrode active material was manufactured and evaluated in the same manner as Experimental Example 1, and the secondary battery was manufactured and evaluated using the positive electrode active material.

The obtained positive electrode active material was checked for the composition and heterogenous phase. It was confirmed that the obtained positive electrode active material in the present Experimental Example was composed of the lithium composite oxide represented by the general formula: $Li_{1.015}Ni_{0.8475}Mn_{0.0990}Zr_{0.0035}Co_{0.0500}O$, and the positive electrode active material was free of heterogenous phase.

In addition, when the particles were observed by SEM, it was confirmed that the particles of the lithium composite oxide were composed of secondary particles in which the primary particles were aggerated.

Other evaluation results are indicated in Tables 1 and 2.

Experimental Example 3

When manufacturing the positive electrode active material, in the mixing step, the same raw materials as in Experimental Example 1 were weighed and mixed so that Li/Me, which is the ratio of the number of atoms of lithium (Li) contained in the obtained raw material mixture to the number of atoms of metal (Me) other than lithium, was 1.015, the ratio of the number of atoms of zirconium among the total number of atoms of the metal component in the nickel-manganese composite oxide particles and the zirconium in zirconium oxide was 0.50 at. %.

Except the above points, the positive electrode active material was manufactured and evaluated in the same manner as Experimental Example 1, and the secondary battery was manufactured and evaluated using the positive electrode active material.

The obtained positive electrode active material was checked for the composition and heterogenous phase. It was confirmed that the lithium composite oxide represented by the general formula: $Li_{1.015}Ni_{0.8468}Mn_{0.0987}Zr_{0.0050}Co_{0.0495}O_2$ was contained in the obtained positive electrode active material in the present Experimental Example. In addition, although the amount as heterogenous phase is infinitesimal, it was confirmed that $Li_2ZrO_3$ which was a lithium-zirconium composite oxide, was contained in the positive electrode active material.

In addition, when the particles were observed by SEM, it was confirmed that the particles of the lithium composite oxide were composed of secondary particles in which the primary particles were aggerated.

Other evaluation results are indicated in Tables 1 and 2.

Experimental Example 4

When manufacturing the positive electrode active material, in the mixing step, the same raw materials as in Experimental Example 1 were weighed and mixed so that Li/Me, which is the ratio of the number of atoms of lithium (Li) contained in the obtained raw material mixture to the number of atoms of metal (Me) other than lithium, was 1.015, the ratio of the number of atoms of zirconium among the total number of atoms of the metal component in the nickel-manganese composite oxide particles and the zirconium in zirconium oxide was 1.00 at. %.

Except the above points, the positive electrode active material was manufactured and evaluated in the same manner as Experimental Example 1, and the secondary battery was manufactured and evaluated using the positive electrode active material.

The obtained positive electrode active material was checked for the composition and heterogenous phase. It was confirmed that the lithium composite oxides represented by the general formula: $Li_{1.015}Ni_{0.8430}Mn_{0.0980}Zr_{0.0100}Co_{0.0490}O_2$ was contained in the obtained positive electrode active material in the present Experimental Example. In addition, although the amount as heterogenous phases are infinitesimal, it was confirmed that $Li_2ZrO_3$ that was lithium-zirconium composite oxides, were contained in the positive electrode active material.

In addition, when the particles were observed by SEM, it was confirmed that the particles of the lithium composite oxide were composed of secondary particles in which the primary particles were aggerated.

Other evaluation results are indicated in Tables 1 and 2.

Experimental Example 5

When manufacturing the positive electrode active material, the positive electrode active material was manufactured and evaluated in the same manner as Experimental Example 3 except that the firing temperature was set to 830° C. in the firing step. Further, the secondary battery was manufactured and evaluated using the positive electrode active material.

The obtained positive electrode active material was checked for the composition and heterogenous phase. It was confirmed that the lithium composite oxide represented by the general formula: $Li_{1.015}Ni_{0.8468}Mn_{0.0987}Zr_{0.0050}Co_{0.0495}O_2$ was contained in the positive electrode active material obtained in the present Experimental Example. In addition, although the amount as heterogenous phase is infinitesimal, it was confirmed that $Li_2ZrO_3$ which was a lithium-zirconium composite oxide, was contained in the positive electrode active material.

In addition, when the particles were observed by SEM, it was confirmed that the particles of the lithium composite oxide were composed of secondary particles in which the primary particles were aggerated.

Other evaluation results are indicated in Tables 1 and 2.

Experimental Example 6

When manufacturing the positive electrode active material, in the mixing step, the nickel-manganese composite oxide particles same as in Experimental Example 1 and lithium hydroxide were weighed and mixed so that Li/Me, which is the ratio of the number of atoms of the lithium (Li) contained in the obtained raw material mixture to the number of atoms of a metal other than lithium (Me), was 1.015. Zirconium oxide was not added.

Except the above points, the positive electrode active material was manufactured and evaluated in the same manner as Experimental Example 1, and the secondary battery was manufactured and evaluated using the positive electrode active material.

The obtained positive electrode active material was checked for the composition and heterogenous phase. It was confirmed that the obtained positive electrode active material in the present Experimental Example was composed of the lithium composite oxide represented by the general formula: $Li_{1.015}Ni_{0.8500}Mn_{0.1000}Co_{0.0500}O_2$, and the positive electrode active material was free of heterogenous phase.

In addition, when the particles were observed by SEM, it was confirmed that the particles of the lithium composite oxide were composed of secondary particles in which the primary particles were aggerated.

Other evaluation results are indicated in Tables 1 and 2.

Experimental Example 7

When manufacturing the positive electrode active material, in the mixing step, the same raw materials as in Experimental Example 1 were weighed and mixed so that Li/Me, which is the ratio of the number of atoms of lithium (Li) contained in the obtained raw material mixture to the number of atoms of metal (Me) other than lithium, was 1.015, the ratio of the number of atoms of zirconium among the total number of atoms of the metal component in the nickel-manganese composite oxide particles and the zirconium in zirconium oxide was 0.02 at. %.

Except the above points, the positive electrode active material was manufactured and evaluated in the same manner as Experimental Example 1, and the secondary battery was manufactured and evaluated using the positive electrode active material.

The obtained positive electrode active material was checked for the composition and heterogenous phase. The obtained positive electrode active material in the present Experimental Example was composed of lithium composite oxide represented by the general formula: $Li_{1.015}Ni_{0.8498}Mn_{0.1000}Zr_{0.0002}Co_{0.0500}O_2$, and the positive electrode active material was free of heterogenous phase.

In addition, when the particles were observed by SEM, it was confirmed that the particles of the lithium composite oxide were composed of secondary particles in which the primary particles were aggerated.

Other evaluation results are indicated in Tables 1 and 2.

Experimental Example 8

When manufacturing the positive electrode active material, in the mixing step, the same raw materials as in Experimental Example 1 were weighed and mixed so that Li/Me, which is the ratio of the number of atoms of lithium (Li) contained in the obtained raw material mixture to the number of atoms of metal (Me) other than lithium, was 1.015, the ratio of the number of atoms of zirconium among the total number of atoms of the metal component in the nickel-manganese composite oxide particles and the zirconium in zirconium oxide was 1.50 at. %.

Except the above points, the positive electrode active material was manufactured and evaluated in the same manner as Experimental Example 1, and the secondary battery was manufactured and evaluated using the positive electrode active material.

The obtained positive electrode active material was checked for the composition and heterogenous phase. It was confirmed that a lithium composite oxide represented by the general formula: $Li_{1.015}Ni_{0.8400}Mn_{0.097}Zr_{0.0150}Co_{0.0480}O_2$ was contained in the positive electrode active material obtained in the present Experimental Example. In addition, although the amount as heterogenous phase is infinitesimal, it was confirmed that $Li_2ZrO_3$ which was a lithium-zirconium composite oxide, was contained in the positive electrode active material.

In addition, when the particles were observed by SEM, it was confirmed that the particles of the lithium composite oxide were composed of secondary particles in which the primary particles were aggerated.

Other evaluation results are indicated in Tables 1 and 2.

Experimental Example 9

When manufacturing the positive electrode active material, in the mixing step, zirconium oxide with an average particle diameter of 5.2 μm was used as the zirconium source, and the same raw materials as in Experimental Example 1 were used for the other raw materials. In addition, in the mixing step, Li/Me, which is the ratio of the number of atoms of lithium (Li) contained in the obtained raw material mixture to the number of atoms of metal (Me) other than lithium, was 1.015, the ratio of the number of atoms of zirconium among the total number of atoms of the metal component in the nickel-manganese composite oxide particles and the zirconium in zirconium oxide was 0.35 at. %.

Except the above points, the positive electrode active material was manufactured and evaluated in the same manner as Experimental Example 1, and the secondary battery was manufactured and evaluated using the positive electrode active material.

The obtained positive electrode active material was checked for the composition and heterogenous phase. It was confirmed that the lithium composite oxide represented by the general formula:

$Li_{1.015}Ni_{0.8475}Mn_{0.0990}Zr_{0.0035}Co_{0.0500}O_2$ was contained in the positive electrode active material obtained in the present Experimental Example. In addition, although the amount as heterogenous phase is infinitesimal, it was confirmed that $ZrO_2$ or $Li_2ZrO_3$ which was a lithium-zirconium composite oxide, was contained in the positive electrode active material.

In addition, when the particles were observed by SEM, it was confirmed that the particles of the lithium composite oxide were composed of secondary particles in which the primary particles were aggerated.

Other evaluation results are shown in Tables 1 and 2.

Experimental Example 10

When manufacturing the positive electrode active material, in the firing step, the positive electrode active material was manufactured and evaluated in the same manner as Experimental Example 2 except that the firing was performed under an oxygen-containing atmosphere in which the oxygen concentration was 65% by volume and the remaining was nitrogen. Further, the secondary battery was manufactured and evaluated using the positive electrode active material.

The obtained positive electrode active material was checked for the composition and heterogenous phase. It was confirmed that the lithium composite oxide represented by the general formula: $Li_{1.015}Ni_{0.8475}Mn_{0.0990}Zr_{0.0035}Co_{0.0500}O_2$ was contained in the positive electrode active material obtained in the present Experimental Example. In addition, although the amount as heterogenous phase is infinitesimal, it was confirmed that $ZrO_2$ or $Li_2ZrO_3$ which was a lithium-zirconium composite oxide, was contained in the positive electrode active material.

In addition, when the particles were observed by SEM, it was confirmed that the particles of the lithium composite oxide were composed of secondary particles in which the primary particles were aggerated.

Other evaluation results are indicated in Tables 1 and 2.

Experimental Example 11

(1) Preparation of Nickel-Manganese Composite Compound (Crystallization Step)

First, water was added to half of the reactor (60 L), and the temperature in the reactor was set at 49° C. while stirring. At this time, nitrogen gas ($N_2$) and air were supplied to the reactor to adjust the flow rate of $N_2$/Air so that the dissolved oxygen concentration in the liquid in the reactor was to be 1.7 mg/L or higher and 2.7 mg/L or lower.

An initial solution was prepared by adding an appropriate amount of 25% by mass of sodium hydroxide solution, which is an alkaline solution, and 25% by mass of aqueous ammonia, which is a complexing agent, to the water in the reactor so that the pH value was 12.5 at the liquid temperature of 49° C. and the ammonia concentration was 12 g/L.

At the same time, nickel sulfate, manganese sulfate, and cobalt sulfate were dissolved in pure water so that the amount of substance ratio of nickel, manganese, and cobalt was Ni:Mn:Co=90.0:5.0:5.0 to prepare a mixed solution with a concentration of metal components of 2.0 mol/L.

This mixed solution was dropped at a constant rate with respect to the initial solution of the reactor, and was used as the reaction solution. At this time, 25% by mass of sodium hydroxide solution, which is an alkali solution, and 25% by mass of aqueous ammonia, which is a complexing agent, were also dropped onto the initial solution at a constant rate. The pH value of the reaction solution was controlled so as to maintain the pH value of 12.5 or higher and 12.6 or lower at the liquid temperature of 49° C. and the ammonia concentration of 12.0 g/L. The nickel-manganese composite hydroxide particles were crystallized by such an operation (crystallization step).

Thereafter, a slurry containing the nickel-manganese composite hydroxide particles collected from an overflow port which was provided in the reactor was filtered, water-soluble impurities were washed off with ion-exchange water, and then dried.

(Oxidizing Roasting Step)

The resulting nickel-manganese composite hydroxide particles were oxidative-roasted at 500° C. for 5 hours in the air (oxygen concentration: 21% by volume) flow. Accordingly, the nickel-manganese composite oxide particles containing nickel, manganese, and cobalt in the amount of substance ratio of Ni:Mn:Co=90.0:5.0:5.0 was obtained.

(2) Manufacture of Positive Electrode Active Material (Mixing Step)

The resulting nickel-manganese composite oxide particles, lithium hydroxide which is a lithium compound with an average particle size of 25 μm, and zirconium oxide with an average particle size of 1.5 μm were thoroughly mixed using a shaker mixer (TURBULA Type T2C, manufactured by Willy A. Bachofen AG (WAB)) to prepare a raw material mixture. At this time, Li/Me, which is the ratio of the number of lithium (Li) atom contained in the obtained raw material mixture to the number of atoms of the metal (Me) other than lithium, was determined to be 1.010, and each raw material was weighed and mixed so that the ratio of the number of atoms of zirconium among the total number of atoms of the metal component in the nickel-manganese composite oxide particles and the zirconium in zirconium oxide was 0.50 at. %.

(Firing Step)

The raw material mixture obtained in the mixing step was fired at 780° C. for 8 hours under an oxygen-containing atmosphere in which the oxygen concentration was 87% by volume and the remaining portion was nitrogen.

The resulting fired product was crushed using a pin mill at a strength sufficient to maintain the shape of the secondary particles.

By the above-described procedure, the positive electrode active material consisting of lithium composite oxide particles (lithium composite oxide powder) was obtained.

The obtained positive electrode active material was checked for the composition and heterogenous phase. It was confirmed that the lithium composite oxide represented by the general formula: $Li_{1.010}Ni_{0.8958}Mn_{0.0495}Zr_{0.0050}Co_{0.0497}O_2$ was contained in the obtained positive electrode active material in the present Experimental Example. In addition, although the amount as heterogenous phase is infinitesimal, it was confirmed that $Li_2ZrO_3$ which was a lithium-zirconium composite oxide, was contained in the positive electrode active material.

Figure 5A:
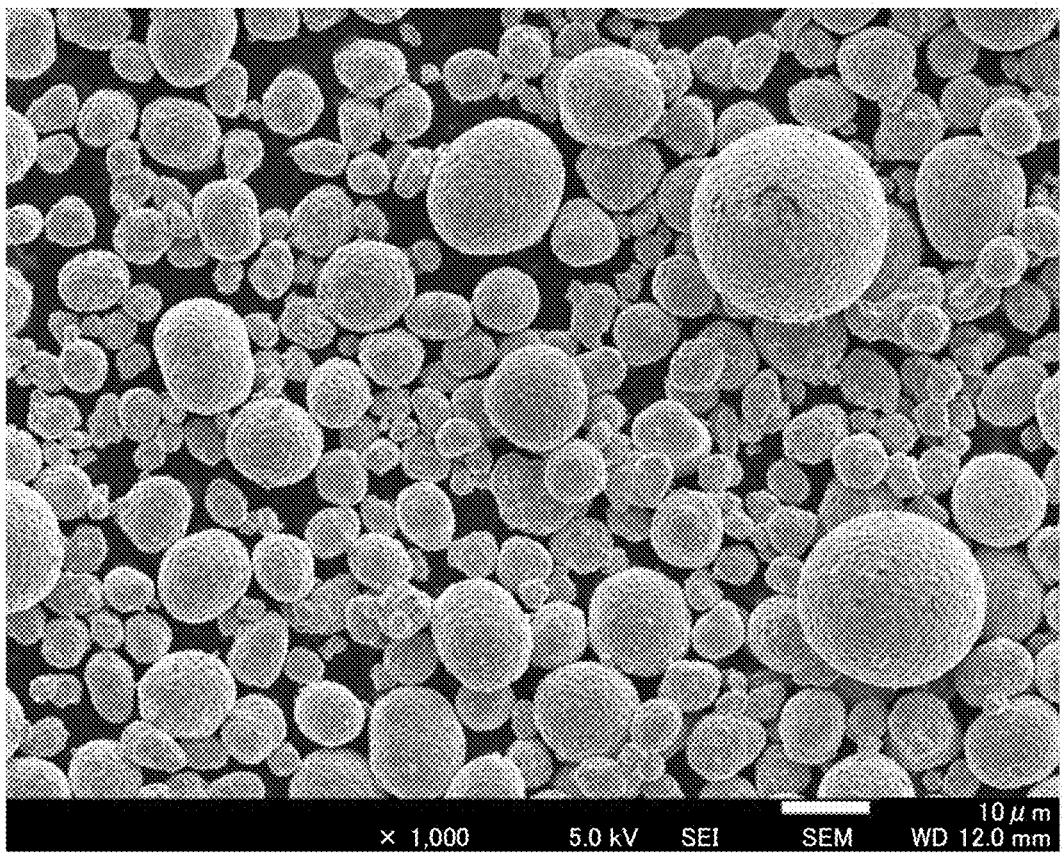
FIG. 5A is an SEM image of lithium composite oxide particles contained in a positive electrode active material of Experimental Example 11.
Figure 5B:
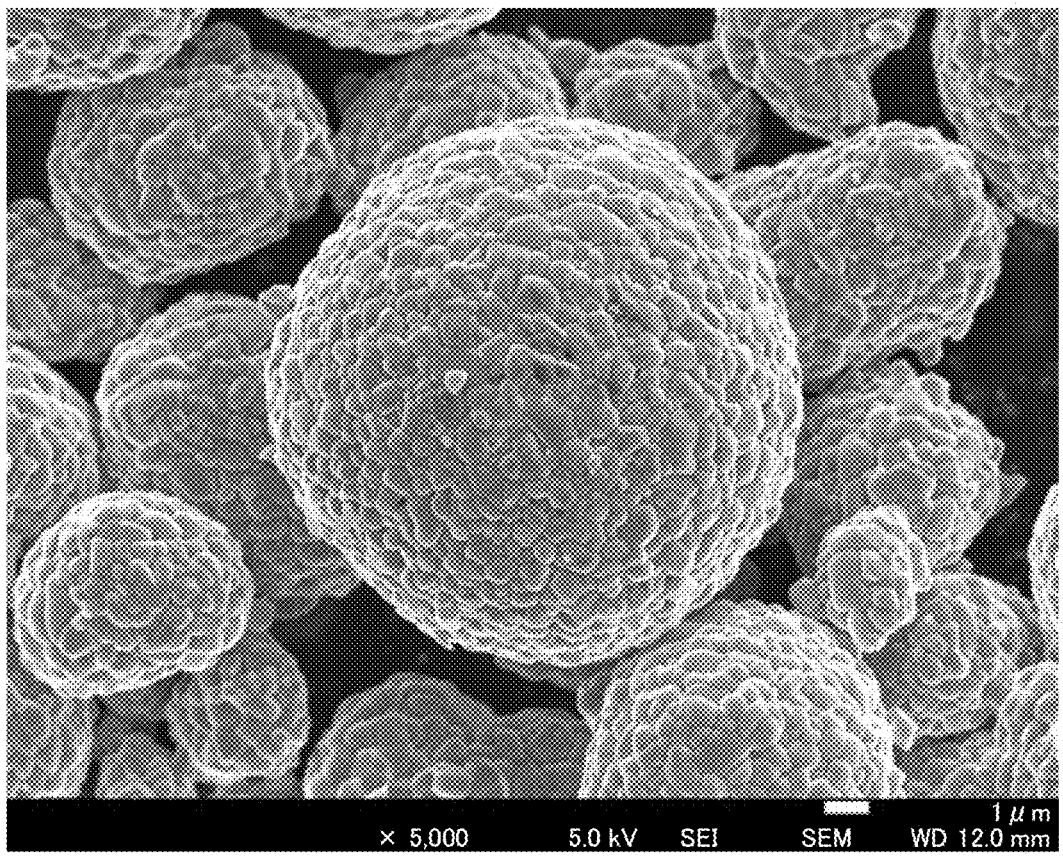
FIG. 5B is an SEM image of lithium composite oxide particles contained in a positive electrode active material of Experimental Example 11.

In addition, SEM images of the lithium composite oxide particles contained in the obtained positive electrode active material were indicated in FIGS. 5A and 5B. As indicated in FIGS. 5A and 5B, it was confirmed that the lithium composite oxide particles were composed of the secondary particles in which primary particles were aggregated.

Other evaluation results are indicated in Table 1.

In addition, the obtained positive electrode active material was used to manufacture and evaluate the secondary battery in the same manner as Experimental Example 1. The evaluation results are indicated in Table 2.

Experimental Example 12

When manufacturing the positive electrode active material, in the mixing step, the same nickel-manganese composite oxide particles in Experimental Example 11 and lithium hydroxide as were weighed and mixed so that Li/Me, which is the ratio of the number of atoms of lithium (Li) contained in the obtained raw material mixture to the number of atoms of metal (Me) other than lithium, was 1.010. It should be noted that an addition of zirconium oxide was not performed.

Except the above points, the positive electrode active material was manufactured and evaluated in the same manner as Experimental Example 11, and the secondary battery was manufactured and evaluated using the positive electrode active material.

The obtained positive electrode active material was checked for the composition and heterogenous phase. It was confirmed that the lithium composite oxide represented by the general formula: $Li_{1.010}Ni_{0.900}Mn_{0.0500}Co_{0.0500}O_2$ was contained in the positive electrode active material obtained in the present Experimental Example, and a heterogenous was not contained.

In addition, when the particles were observed by SEM, it was confirmed that the particles of the lithium composite oxide were composed of secondary particles in which the primary particles were aggerated.

Other evaluation results are indicated in Tables 1 and 2.

TABLE 1

| | Condition of mixing step Average particle size of zirconium compound μm | Conditions of firing step | | Evaluation results | | | | | | Ave. |
|---|---|---|---|---|---|---|---|---|---|---|
| | | | | Composition | | | | | | |
| | | Firing temperature °C. | Oxygen concentration % by volume | Ni | Mn | Zr at. % | Co | Total | Li/Me ratio | particle size D50 μm |
| Experimental Example 1 | 1.5 | 800 | 87 | 84.90 | 10.00 | 0.10 | 5.00 | 100.0 | 1.015 | 13.0 |
| Experimental Example 2 | 1.5 | 800 | 87 | 84.75 | 9.90 | 0.35 | 5.00 | 100.0 | 1.015 | 13.1 |
| Experimental Example 3 | 1.5 | 800 | 87 | 84.68 | 9.87 | 0.50 | 4.95 | 100.0 | 1.015 | 13.4 |
| Experimental Example 4 | 1.5 | 800 | 87 | 84.30 | 9.80 | 1.00 | 4.90 | 100.0 | 1.015 | 13.2 |
| Experimental Example 5 | 1.5 | 830 | 87 | 84.68 | 9.87 | 0.50 | 4.95 | 100.0 | 1.015 | 13.8 |
| Experimental Example 6 | — | 800 | 87 | 85.00 | 10.00 | 0.00 | 5.00 | 100.0 | 1.015 | 12.8 |
| Experimental Example 7 | 1.5 | 800 | 87 | 84.98 | 10.00 | 0.02 | 5.00 | 100.0 | 1.015 | 12.8 |
| Experimental Example 8 | 1.5 | 800 | 87 | 84.00 | 9.70 | 1.50 | 4.80 | 100.0 | 1.015 | 13.2 |
| Experimental Example 9 | 5.2 | 800 | 87 | 84.75 | 9.90 | 0.35 | 5.00 | 100.0 | 1.015 | 13.0 |
| Experimental Example 10 | 1.5 | 800 | 65 | 84.75 | 9.90 | 0.35 | 5.00 | 100.0 | 1.015 | 15.8 |
| Experimental Example 11 | 1.5 | 780 | 90 | 89.58 | 4.95 | 0.50 | 4.97 | 100.0 | 1.010 | 11.9 |
| Experimental Example 12 | 1.5 | 780 | 90 | 90.00 | 5.00 | 0.00 | 5.00 | 100.0 | 1.010 | 11.7 |

| | Evaluation results | | | | | | | | |
|---|---|---|---|---|---|---|---|---|---|
| | Lattice constant a Å | Lattice constant c Å | Unit lattice volume Å³ | $I_{(003)}/I_{(104)}$ | Specific surface area m²/g | Amount of eluted lithium % by mass | Water content % by mass | Heterogenous phase | Circularity |
| Experimental Example 1 | 2.8751 | 14.2145 | 117.50 | 1.77 | 0.23 | 0.12 | 0.04 | — | 0.962 |
| Experimental Example 2 | 2.8752 | 14.2154 | 117.52 | 1.79 | 0.22 | 0.11 | 0.04 | — | 0.952 |
| Experimental Example 3 | 2.8754 | 14.2167 | 117.54 | 1.83 | 0.26 | 0.12 | 0.03 | $Li_2ZrO_3$ | 0.948 |
| Experimental Example 4 | 2.8760 | 14.2170 | 117.59 | 1.81 | 0.29 | 0.15 | 0.05 | $Li_2ZrO_3$ | 0.939 |
| Experimental Example 5 | 2.8756 | 14.2128 | 117.53 | 1.76 | 0.24 | 0.09 | 0.035 | $Li_2ZrO_3$ | 0.927 |
| Experimental Example 6 | 2.8748 | 14.2121 | 117.46 | 1.73 | 0.22 | 0.14 | 0.06 | — | 0.924 |
| Experimental Example 7 | 2.8748 | 14.2138 | 117.47 | 1.74 | 0.22 | 0.13 | 0.04 | — | 0.935 |
| Experimental Example 8 | 2.8765 | 14.2180 | 117.64 | 1.69 | 0.32 | 0.19 | 0.060 | $Li_2ZrO_3$ | 0.910 |

TABLE 1-continued

|  | | | | | | | | | |
|---|---|---|---|---|---|---|---|---|---|
| Experimental Example 9 | 2.8749 | 14.2145 | 117.48 | 1.75 | 0.48 | 0.28 | 0.13 | ZrO$_2$, Li$_2$ZrO$_3$ | 0.912 |
| Experimental Example 10 | 2.8751 | 14.2183 | 117.53 | 1.67 | 0.31 | 0.31 | 0.15 | ZrO$_2$, Li$_2$ZrO$_3$ | 0.896 |
| Experimental Example 11 | 2.8758 | 14.2091 | 117.51 | 1.75 | 0.25 | 0.12 | 0.05 | Li$_2$ZrO$_3$ | 0.935 |
| Experimental Example 12 | 2.8750 | 14.2038 | 117.41 | 1.69 | 0.23 | 0.17 | 0.06 | — | 0.921 |

TABLE 2

|  | Charge capacity mAh/g | Discharge capacity mAh/g | Efficiency % | Positive electrode resistance Ω | Capacity maintenance rate after 500 cycles % | After cycle SOC 20% Ω | After cycle SOC 80% Ω | Amount of storage gas (after 7 days) — |
|---|---|---|---|---|---|---|---|---|
| Experimental Example 1 | 235.8 | 209.7 | 88.9 | 3.2 | 68.5 | 9.5 | 10.1 | 0.86 |
| Experimental Example 2 | 233.5 | 208.2 | 89.2 | 3.0 | 71.6 | 6.4 | 6.7 | 0.81 |
| Experimental Example 3 | 232.8 | 207.4 | 89.1 | 2.9 | 70.2 | 6.2 | 6.4 | 0.80 |
| Experimental Example 4 | 232.0 | 205.0 | 88.4 | 2.8 | 69.1 | 6.1 | 6.3 | 0.93 |
| Experimental Example 5 | 234.0 | 208.4 | 89.1 | 2.8 | 69.4 | 6.0 | 6.3 | 0.74 |
| Experimental Example 6 | 236.3 | 210.8 | 89.2 | 3.6 | 63.5 | 12.0 | 13.7 | 1.00 |
| Experimental Example 7 | 235.0 | 209.5 | 89.1 | 3.5 | 64.0 | 11.2 | 12.8 | 0.98 |
| Experimental Example 8 | 231.1 | 203.0 | 87.8 | 3.5 | 64.4 | 10.3 | 11.2 | 1.04 |
| Experimental Example 9 | 232.0 | 205.3 | 88.5 | 3.8 | 67.2 | 9.2 | 10.6 | 1.12 |
| Experimental Example 10 | 225.0 | 199.4 | 88.6 | 3.7 | 70.0 | 13.4 | 14.5 | 1.40 |
| Experimental Example 11 | 242.4 | 222.1 | 91.6 | 2.5 | 62.0 | 7.5 | 7.9 | 0.87 |
| Experimental Example 12 | 244.0 | 223.8 | 91.7 | 2.8 | 58.1 | 14.3 | 15.3 | 1.00 |

According to the results indicated in Tables 1 and 2, it was confirmed that the positive electrode active materials containing the particles of lithium composite oxide in which the particles have the predetermined amount of Zr, and the unit lattice volume V(Å$^3$) and the peak strength ratio I$_{(003)}$/In$_{(104)}$ were within a predetermined range, in Experimental Examples 1 to 5, and 11 were capable of enhancing the cycle characteristics and suppressing a generation of gas.

As described above, the positive electrode active material for a lithium ion secondary battery, the method of manufacturing the positive electrode active material for a lithium ion secondary battery, and the lithium ion secondary battery are described in the embodiments and the examples, but the present invention is not limited to the above-described embodiments and the examples. Various modifications and variations are possible within the scope of the invention as defined in the claims.

The present application is based on and claims priority of Patent Application No. 2019-031046 filed on Feb. 22, 2019 with the Japan Patent Office, the entire contents of Japanese Patent Application No. 2019-031046 are hereby incorporated by reference.

The invention claimed is:

1. A positive electrode active material for a lithium ion secondary battery containing lithium composite oxide particles, the lithium composite oxide particles comprising: lithium (Li), nickel (Ni), manganese (Mn), zirconium (Zr), and an additive element M in an amount of substance ratio of Li:Ni:Mn:Zr:M=a:b:c:d:e, wherein $0.95 \leq a \leq 1.20$, $0.70 \leq b \leq 0.98$, $0.01 \leq c \leq 0.20$, $0.0003 \leq d \leq 0.01$, and $0.01 \leq e \leq 0.20$, and the additive element M is one or more elements selected from Co, W, Mo, V, Mg, Ca, Al, Ti, and Ta, wherein, a unit lattice volume V (Å$^3$) determined from lattice constants a and c that are calculated from an X-ray diffraction pattern in the lithium composite oxide is 117.5 Å$^3$ or more and 118.0 Å$^3$ or less, and a ratio I$_{(003)}$/I$_{(104)}$ of a peak strength I$_{(003)}$ of a (003) plane to a peak strength I$_{(104)}$ of a (104) plane is 1.70 or more.

2. The positive electrode active material for a lithium ion secondary battery according to claim 1, wherein an amount of eluted lithium determined by Warder method is 0.02% by mass or more and 0.15% by mass or less.

3. The positive electrode active material for a lithium ion secondary battery according to claim 1, wherein the positive electrode active material further comprises a lithium-zirconium composite oxide.

4. The positive electrode active material for a lithium ion secondary battery according to claim 1, wherein a water content is 0.10% by mass or less.

5. The positive electrode active material for a lithium ion secondary battery according to claim 1, wherein a circularity determined by a flow-type image analysis method using a wet-type flow particle size and shape analyzer is 0.92 or more and 0.97 or less.

6. A method of manufacturing a positive electrode active material for a lithium ion secondary battery comprising:
- a mixing step of mixing a nickel-manganese composite compound containing nickel, manganese, and an additive element M, with a lithium compound, and a zirconium compound having an average particle size of 0.5 μm or more and 5.0 μm or less, and preparing a raw material mixture containing lithium (Li), nickel (Ni), manganese (Mn), zirconium (Zr), and the additive element M in an amount of substance ratio of Li:Ni:Mn:Zr:M=a:b:c:d:e, wherein $0.95 \leq a \leq 1.20$, $0.70 \leq b \leq 0.98$, $0.01 \leq c \leq 0.20$, $0.0003 \leq d \leq 0.01$, $0.01 \leq e \leq 0.20$, and the additive element M is one or more elements selected from Co, W, Mo, V, Mg, Ca, Al, Ti, and Ta, and
- a firing step of firing the raw material mixture at a temperature of 750° C. or higher and 900° C. or lower under an oxygen-containing atmosphere in which an oxygen concentration is 80% by volume or more and 97% by volume or less.

7. A lithium ion secondary battery having a positive electrode including the positive electrode active material for a lithium ion secondary battery of claim 1.

8. The positive electrode active material for a lithium ion secondary battery according to claim 1, wherein $0.0003 \leq d \leq 0.008$.

9. The positive electrode active material for a lithium ion secondary battery according to claim 1, wherein
- the lithium composite oxide particles are a product obtained by firing a raw material mixture obtained by mixing nickel-manganese composite oxide particles containing nickel, manganese, and the additive element M; a lithium compound; and a zirconium compound,
- the nickel-manganese composite oxide particles are obtained by oxidatively roasting nickel-manganese composite hydroxide particles, and
- the nickel-manganese composite hydroxide particles are obtained by a method including: preparing a mixed solution that contains a nickel compound, a manganese compound, and the additive element M; and crystallizing the nickel-manganese composite hydroxide particles from the mixed solution.

10. The method of manufacturing a positive electrode active material for a lithium ion secondary battery according to claim 6, wherein $0.0003 \leq d \leq 0.008$.

11. The method of manufacturing a positive electrode active material for a lithium ion secondary battery according to claim 6, wherein
- the nickel-manganese composite compound particles are obtained by oxidatively roasting nickel-manganese composite hydroxide particles, and
- the nickel-manganese composite hydroxide particles are obtained by a method including: preparing a mixed solution that contains a nickel compound, a manganese compound, and the additive element M; and crystallizing the nickel-manganese composite hydroxide particles from the mixed solution.

* * * * *